United States Patent
Wible

(10) Patent No.: US 7,201,033 B2
(45) Date of Patent: Apr. 10, 2007

(54) FLOWMETER IN-SITU CALIBRATION VERIFICATION SYSTEM

(75) Inventor: Eric J. Wible, Carlsbad, CA (US)

(73) Assignee: Fluid Components International LLC, San Marcos, CA (US)

(*) Notice: Subject to any disclaimer, the term of this patent is extended or adjusted under 35 U.S.C. 154(b) by 198 days.

(21) Appl. No.: 11/038,349

(22) Filed: Jan. 18, 2005

(65) Prior Publication Data
US 2005/0145007 A1    Jul. 7, 2005

Related U.S. Application Data

(63) Continuation-in-part of application No. 10/641,685, filed on Aug. 14, 2003.

(51) Int. Cl.
G01F 25/00    (2006.01)
G01F 1/68     (2006.01)

(52) U.S. Cl. .................................... 73/1.16; 73/204.23
(58) Field of Classification Search ................ 73/1.16, 73/204.5, 204.15, 204.16, 204.17, 204.23, 73/204.25, 204.27
See application file for complete search history.

(56) References Cited

U.S. PATENT DOCUMENTS

| 4,083,244 | A | * | 4/1978 | Agar et al. ............... 73/204.21 |
| 4,885,938 | A | * | 12/1989 | Higashi ................... 73/204.18 |
| 4,967,593 | A | | 11/1990 | McQueen |
| 4,994,780 | A | | 2/1991 | McQueen |
| 5,134,772 | A | | 8/1992 | McQueen |
| 5,221,916 | A | * | 6/1993 | McQueen ..................... 338/24 |
| 5,237,523 | A | * | 8/1993 | Bonne et al. ............... 702/100 |
| 5,339,687 | A | * | 8/1994 | Gimson et al. ........... 73/204.19 |
| 5,355,727 | A | | 10/1994 | McQueen |
| 5,576,487 | A | * | 11/1996 | Gimson ................... 73/204.11 |
| 5,600,528 | A | | 2/1997 | McQueen |
| 5,753,815 | A | * | 5/1998 | Murata ..................... 73/204.15 |
| 5,780,737 | A | | 7/1998 | Wible et al. |
| 5,792,951 | A | * | 8/1998 | Ismail et al. ............. 73/204.11 |
| 5,913,250 | A | | 6/1999 | Wible |
| 6,208,254 | B1 | | 3/2001 | McQueen et al. |
| 6,536,273 | B2 | * | 3/2003 | Schrittenlacher ......... 73/204.11 |
| 6,539,793 | B2 | * | 4/2003 | Tanimoto et al. ........ 73/204.15 |
| 6,672,154 | B1 | * | 1/2004 | Yamagishi et al. ...... 73/204.22 |
| 6,820,480 | B2 | * | 11/2004 | De'Stefani et al. ...... 73/204.18 |

* cited by examiner

Primary Examiner—Hezron Williams
Assistant Examiner—John Fitzgerald
(74) Attorney, Agent, or Firm—The Maxham Firm

(57) ABSTRACT

A calibration system includes a tube or other conduit, a gas source, and a computational device. The tube has an end positioned relative to a flow sensor, and is in communication with the gas source. The tube and gas source introduce calibration gas into the tube at a repeatable mass flow. During a calibration operation, the conduit directs at least a portion of the calibration gas onto the flow sensor. The computational device is used to calculate an estimated flow rate of the calibration gas based upon the measurements obtained from the flow sensor.

23 Claims, 17 Drawing Sheets

FLOWMETER IN-SITU CALIBRATION VERIFICATION SYSTEM

CROSS REFERENCE TO RELATED APPLICATIONS

This application is a continuation-in-part (CIP) of U.S. application Ser. No. 10/641,685, filed Aug. 14, 2003.

BACKGROUND OF THE INVENTION

1. Field of the Invention

The present invention relates to a calibration system, and more particularly to a flowmeter in-situ calibration verification system.

2. Discussion of the Related Art

Thermal dispersion flowmeters are a common choice for flow metering devices in the commercial and industrial metering markets. A typical sensor element for use in such meters is the resistance temperature detector (RTD), the resistance of which is related to the temperature of the element itself. A typical sensor employs at least two RTD elements. One RTD element is used as a reference element and is normally unheated. The second RTD is used as the active element which is heated. In use, the effect of flow on the heated RTD element provides a measure of the flow velocity of the substance in the duct or conduit being monitored.

Two different methods are commonly used in the thermal dispersion industry to determine the flow in a conduit. One technique is to maintain a constant temperature differential between the reference RTD and the active RTD. This method measures the voltage or current required to maintain the active RTD at a constant temperature above the reference RTD while heat is removed from the active RTD due to the physical properties of the flowing media. The other method measures the voltage difference between the active and the reference RTDs, while the active RTD is heated by a constant current or a constant power heat source. During this measurement, as with the other method, the active RTD loses heat by way of the physical properties of the flowing media.

One factor that affects the accuracy of conventional flowmeters is the consistency of the physical composition of flowing media. In many applications, the flowing media maintains the same general composition, in which case conventional flowmeters could provide sufficiently accurate flow rate measurements. However, in situations such as flare gases and other variable mixed-gas composition situations, the physical composition of the media is constantly changing, resulting in significant challenges for obtaining accurate flow rates.

A flowmeter will periodically need to be calibrated to verify that the meter falls within some acceptable range of accuracy. Current calibration techniques require removal of the flowmeter from its installed location. Upon removal, the flowmeter is often returned to the manufacture or other organization that has the specialized equipment necessary for proper calibration of the meter. This is an expensive and time-consuming process.

SUMMARY OF THE INVENTION

A calibration system includes a tube or other conduit, a gas source, and a computational device. The tube has an end positioned relative to a flow sensor, and is in communication with the gas source. The tube and gas source introduce calibration gas into the tube at a repeatable mass flow. During a calibration operation, the conduit directs at least a portion of the calibration gas onto the flow sensor. The computational device is used to calculate an estimated flow rate of the calibration gas based upon the measurements obtained from the flow sensor.

BRIEF DESCRIPTION OF THE DRAWING

The above and other aspects, features and advantages of the present invention will become more apparent upon consideration of the following description of preferred embodiments taken in conjunction with the accompanying drawing figures, wherein.

DETAILED DESCRIPTION OF THE PREFERRED EMBODIMENTS

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Figure 1:
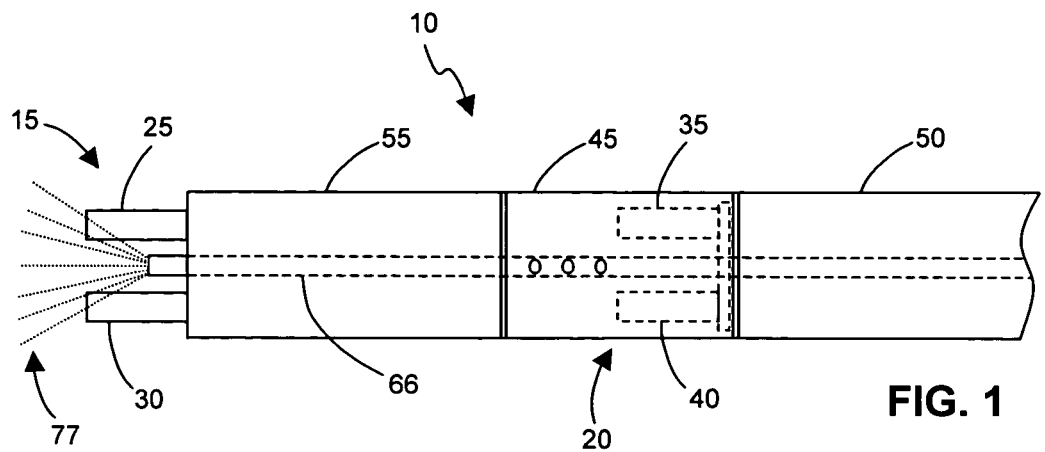
FIG. 1 is a side view a flowmeter probe containing flow and gas properties sensors, in accordance with an embodiment the invention.

Referring now to FIG. 1, a side view of probe 10 in accordance with one embodiment of the present invention is shown. Probe 10 includes thermal flow sensor 15 and gas properties sensor 20. The flow sensor may be implemented using a pair of thermal devices such as resistance temperature detectors (RTDs). In this figure, the flow sensor includes one RTD that is heated and is the active sensor element 25, while the other RTD is a relatively or substantially unheated reference sensor element 30.

In a typical installation, gas mixture flows past the active and reference elements of sensor 15 in a conduit or other environment causing heat dissipation from the active sensor, in comparison with the dissipation from the reference sensor element. Typical flow rates range anywhere from about one-half to about 300 standard feet per second (SFPS). A change in differential temperature ($\Delta T$) is reflected as a change in differential resistance ($\Delta R$). The $\Delta T$ or $\Delta R$ value may be correlated to the instantaneous flow rate of the gas mixture in a conduit, for example. The use of $\Delta R$ is one of the many possible techniques for calculating flow rate. Other techniques will be described in more detail below.

Similar to flow sensor 15, gas properties sensor 20 (shown in dashed lines) may include active and reference RTD sensor elements 35 and 40. These elements are shown contained within mid-well 45, and are positioned between proximal and distal probe elements 50 and 55. In operation, gas mixture flows into a no-flow chamber of the mid-well, coming into contact with the exposed active and reference sensor elements 35 and 40. The differential resistance reflects the heat transfer of the gas mixture in the mid-well. A change in differential resistance ($\Delta R$) may be correlated to a change in the heat transfer of the gas mixture and therefore a change in the gaseous constituents of the gas mixture.

The exemplary description above has generally assumed that the active and reference sensor elements are heat-differential-based, a primary example being RTDs. However, other thermally-based sensors may be used including thermocouples, thermopiles, thermistors, transistors, and diodes, among others.

In accordance with some embodiments, probe 10 has two primary modes of operation. In one mode, the probe measures the rate of flow of gas media flowing within a structure such as a gas conduit. As will be described in detail herein, the rate of flow may be calculated based upon measurements obtained from flow sensor 15 and gas properties sensor 20. In the second mode of operation, the probe is subjected to a calibration process to verify and correct, if necessary, measurements obtained from the flow sensor, or the gas properties sensor, or both sensors. The calibration process may be initiated manually by a user, or this process can be automated to occur on a periodic or predetermined basis.

With regard to the calibration mode of operation, probe 10 is shown configured with calibration verification capabilities. Specifically, the probe includes calibration tube 66, which emits calibration gas 77 from an open end of the calibration tube. The calibration function enables a user to verify the functionality of an associated sensor, such as flow sensor 15 or gas properties sensor 20. Various embodiments are described in which calibration gas is delivered using a calibration tube. However, any structure (for example, channels, conduits, etc.), which can deliver calibration gas at a repeatable mass flow, may alternatively be implemented. Note also that the calibration feature is optional.

Figure 2:
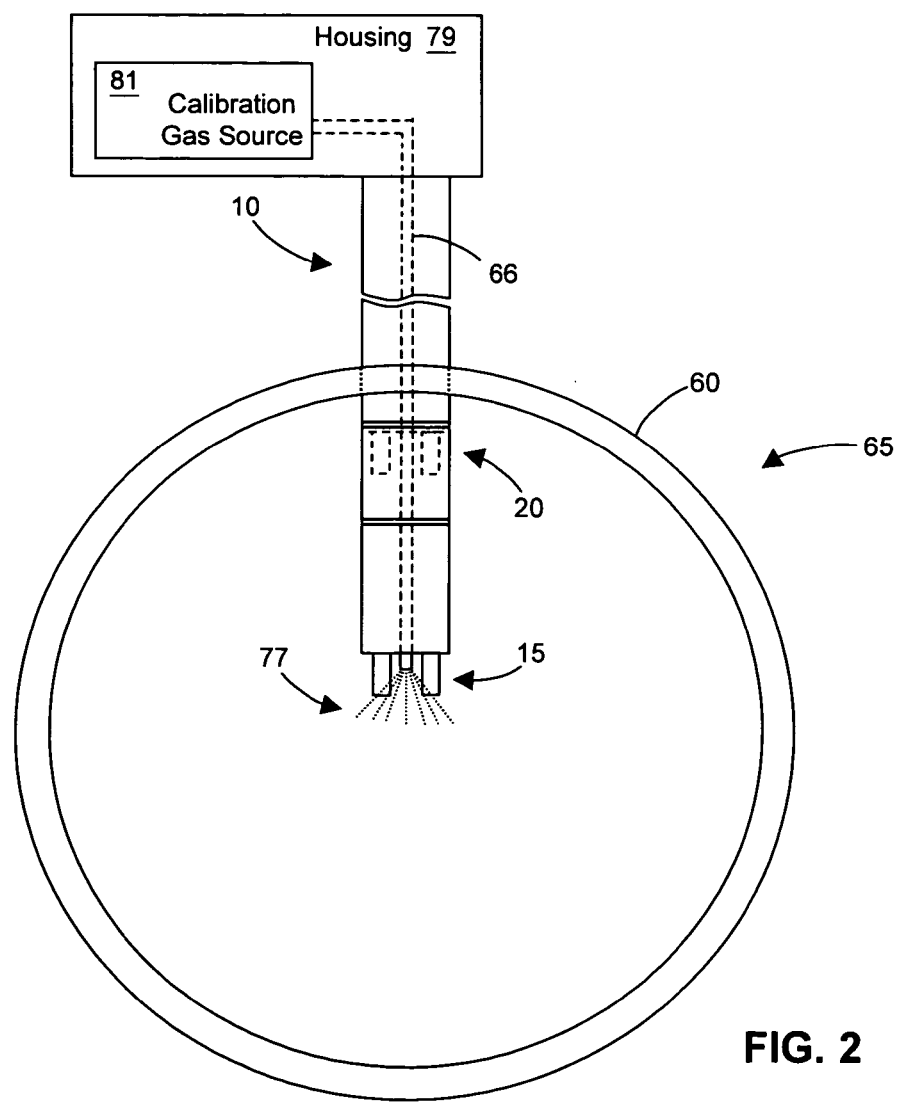
FIG. 2 shows an exemplary implementation of the flowmeter probe of FIG. 1 positioned within a conduit.

FIG. 2 shows a typical implementation of probe 10 configured in wall 60 of conduit 65. In use, gas properties sensor 20 exploits the principal that gases having different constituents exhibit varying levels of heat transfer. Consider, for example, the situation in which a gas mixture is flowing at a constant rate through a conduit. If the composition of the gas mixture changes, so does the heat transfer of the gas mixture. A change in heat transfer affects the heat dissipation rate of the active sensor of the flow sensor, and consequently the flow rate. This means that actual flow rate may be constant, but a change in the constituents of the gas will be reflected as a change in flow rate. The difference between the actual and measured flow rates may be referred to as flow error.

For any flow error, the measured flow rate may change (higher or lower) even though the actual flow rate of the gas mixture remains constant. For example, as the heat transfer of the gas mixture rises, a measured (not actual) flow rate would increase. Conversely, as the heat transfer of the gas mixture falls, the measured flow rate would decrease.

The correction of flow error caused by changing physical properties of the gas mixture may be accomplished by compensating for the heat transfer of the gas mixture. That is, if the heat transfer of the gas mixture can be determined, more accurate flow rates of the gas mixture may be obtained. Correction of flow error can be important in variable mixed-gas composition measurement applications.

In an embodiment, gas properties sensor 20 is configured as a still well to detect the heat transfer of the gas media flowing in the conduit, and is used in cooperation with flow sensor 15. In operation, the flow sensor will measure the flow rate of a gas mixture in conduit 65, while the gas properties sensor measures the heat transfer of the gas. As will be described in more detail herein, the measured flow rate is then adjusted as necessary to compensate for any change in heat transfer of the gas mixture.

Probe 10 is shown coupled with housing 79, which includes optional calibration gas source 81. The calibration gas source provides calibration gas 77 via a suitable conduit such as tube 66. The calibration gas may be any repeatable gas or gas mixture that is acceptable to the process in which probe 10 operates. Examples of suitable calibration gases include air, nitrogen, methane, and the like.

In accordance with an embodiment, calibration gas 77 is released from tube 66 at a repeatable mass flow rate and is directed onto portions of active and reference sensors 25 and 30. The active and reference sensor outputs generate data which may be used to estimate the flow rate of the calibration gas. The accuracy of the sensors may be determined by comparing the estimated and actual flow rate of the calibration gas. The term "flow error" may be used to refer to the difference between the estimated and actual flow rate of the calibration gas. A properly functioning flowmeter may be one in which the flow error falls within some acceptable range of accuracy (for example, a flow error of 0.0% to 3%).

If desired, and as part of the calibration process, the calibration gas source may also be configured to operate at a plurality of different flow rates, each flow rate being associated with a particular sensor output. Using this technique, calibration of the flowmeter may be accomplished by stimulating the active and reference sensor elements with the calibration gas at two or more different flow rates, and then determining flow error of the calibration gas at these different flow rates.

A particular calibration process may proceed as follows. First, calibration gas source 81 may be activated automatically or by a user to provide a suitable calibration gas 77 at 5 PSI, and the outputs from flow sensor 15 may be measured to find ΔR, for example. If the measured ΔR value falls within some predefined limits of an expected ΔR value, then the sensor is deemed to be operating appropriately. This calibration procedure may be repeated for a range of gas pressures (for example, 10 PSI, 50 PSI, 100 PSI, and others if desired) as may be appropriate in a particular application.

FIGS. 1 and 2 show calibration gas 77 striking both active sensor 25 and reference sensor 30, but this is not a requirement. Sufficiently accurate calibration measurements may alternatively be obtained by directing the calibration gas only to the active sensor. If only the active sensor is utilized during calibration, the accuracy of the calibration process can be optimized by reducing the difference in temperature of the calibration gas and the active sensor. Extremely accurate results may be obtained if the difference in temperature of these components is reduced to a range of about 0° F. to about 3° F., for example.

A flowmeter may be calibrated using several different techniques. In general, the flowmeter is calibrated only when the meter is not actively measuring gas media flowing in the conduit. For example, the flowmeter may be calibrated in-situ by temporarily stopping gas flow within conduit 65, and then subjecting the meter to the calibration gas. Alternatively, a field calibration technique may be initiated by first removing probe 10 from the conduit and then performing the calibration process. The field calibration technique does not require the stopping of the gas flow within the conduit. Another possible calibration technique is to utilize a housing or other arrangement for which probe 10 may be temporarily removed from the flow gas media. This technique also does not require the stopping of the gas flow within the conduit, and will be described in more detail in conjunction with FIGS. 22 and 23.

One benefit provided by the calibration functions disclosed herein is that there is no need for additional elements to be temporarily connected to the flowmeter for test purposes. In addition, the flowmeter does not require any element of disassembly, which are common aspects of prior art devices. The flowmeter may be calibrated in-situ, in a matter of minutes, which is a vast improvement over existing devices that require several days or weeks for calibration performed at remote testing facilities.

Figure 3:
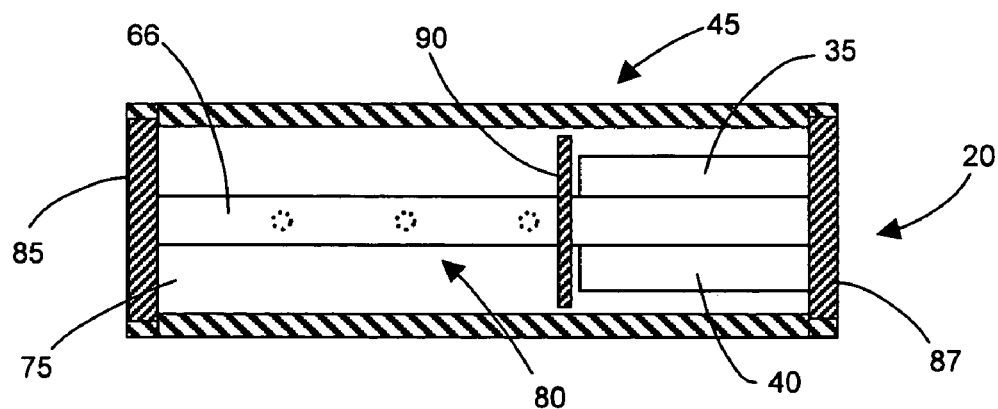
FIG. 3 is an assembled, enlarged cross-sectional diagram showing a more detailed view of the various components contained, according to one embodiment of the invention, within the mid-well portion of the flowmeter probe of FIG. 1.

FIG. 3 is an assembled, cross-sectional diagram showing a more detailed view of the various components contained, according to one embodiment of the invention, within the mid-well portion of the flowmeter probe. Mid-well 45 is shown having endplates 85 and 87 to seal its interior from the other parts of the probe. To ensure that flow is not a factor to sensor elements 35 and 40, downstream holes 80 allow gas to enter into no-flow chamber 75. These gas holes permit sufficient quantities of gas to enter the no-flow chamber, and in conjunction with baffle 90, to come into contact with active and reference sensors 35 and 40. Typically, the mid-well is configured with one or more apertures, but other designs are possible.

To optimize the heat transfer measurements performed by gas properties sensor 20, it is desirable to minimize the flow of gas within the no-flow chamber. The essence of the mid-well configuration shown in these figures is to permit the active and reference sensors to sample the flowing gas in a quiescent or "no flow" surroundings. Baffle 90 is typically utilized to further reduce gas flow within the chamber. The particular design of a no-flow environment created within mid-well 45 is not critical or essential, and any other suitable design that permits sufficiently accurate heat transfer measurements by sensor 20 may be used.

Figure 4:
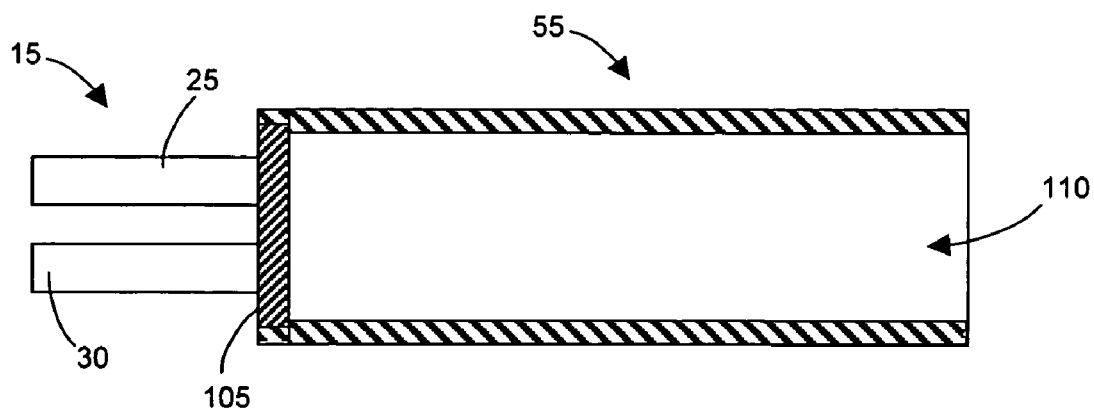
FIG. 4 is a cross-sectional diagram showing a more detailed view of the thermal flow sensor portion of the flowmeter probe of FIG. 1.

FIG. 4 is a cross-sectional diagram showing a more detailed view of thermal flow sensor 15. A suitable device, such as base plate 105, may be used to couple the active and reference sensors 25 and 30 to the distal element. Distal element 55 is shown having cavity 110, which may be used for routing the wiring required to connect the sensors to the circuitry.

Figure 5:
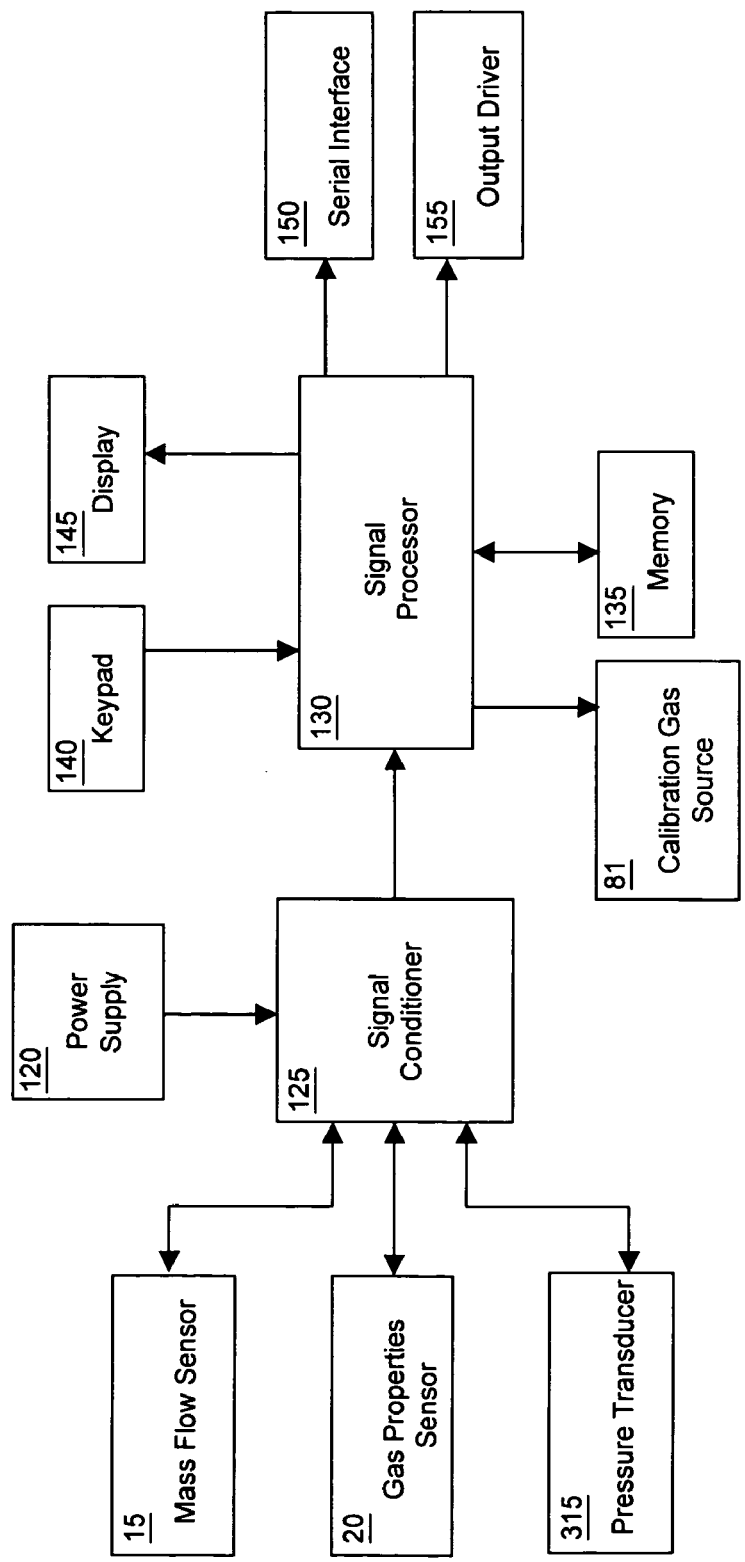
FIG. 5 is a simplified exemplary block diagram showing basic circuitry components which may be coupled to the flow and gas properties sensors.

FIG. 5 is an example of a simplified block diagram showing the basic circuitry components which may be coupled to flow and gas properties sensors 15 and 20. This figure will be described with reference made to the probe components depicted in FIGS. 1 and 2. However, the description provided herein applies equally to other probe configurations, such as those depicted in later figures. Some or all of the non-sensor element components depicted in FIG. 5 may be positioned within housing 79, which is normally immediately outside conduit 65. Alternatively, some or all of these components could be located at a central, remote, location.

Power supply 120 is shown providing the necessary power to the flowmeter, while signal conditioner 125 develops power levels and signal formats that may be required for the various components in the meter. In use, signal outputs generated by flow and gas properties sensors 15 and 20 are directed to the signal conditioner, ultimately reaching signal processor 130. Using any of a variety of known techniques, the signal processor determines the flow rate based upon the outputs from the flow sensor, and the heat transfer of the flowing gas based upon the outputs from the gas properties sensor. In accordance an embodiment, the signal processor further provides a compensated flow rate that accounts for any change in the heat transfer of the flowing gas mixture. This feature will be described in more detail with regard to the graphs of FIGS. 6–9.

The power supply can provide any appropriate power level and format to the flowmeter, as determined by the signal conditioner. Typically it will supply a variable 20–42 volts dc (VDC) to power and heat sensors 15 and 20, and a regulated 5 VDC for the digital logic. The 5 VDC is a current standard, but the power to the flowmeter components could be modified as may be required or desired. The power supply may itself be powered by an incoming source of 115 or 230 volts ac (VAC), or 24 VDC.

Any of a variety of different techniques may be used for controlling flow sensor 15 to determine flow rate, and for controlling gas properties sensor 20 to determine the heat transfer of the flowing gas. For example, one technique is where signal conditioner 125 is configured to convert 20–42 VDC to a constant current of 0.5 mA to energize the reference sensors 30 and 40, and 20 mA to heat active sensors 25 and 35.

In operation, with regard to the flow sensor, the signal conditioner senses the voltages across sensors 25 and 30 to determine the voltage difference (ΔV). The ΔV results from a resistance change (ΔR) at constant current, which is proportional to ΔT, providing a basis for calculating the flow rate of the media involved in accordance with known technologies. The signal conditioner senses the voltages across sensors 35 and 40 in similar fashion to determine the ΔR for this particular sensor, thus providing a basis for calculating the heat transfer of the gas. The heating current of 20 mA is an example only and any stimulation that produces the desired result can be used.

Another technique is one in which signal conditioner 125 operates with respect to active and reference sensors 25 and 30 as a constant power source, where the current to and voltage across these sensors can vary. In this configuration, the signal conditioner typically includes a multiplier circuit which monitors the power (V×I) for each of these sensors and holds that power constant. The change in either current to or voltage across the active sensor is related to resistance change ($\Delta R$) (and hence, temperature change ($\Delta T$)), and is therefore used to calculate the flow rate of the media. The active and reference sensors 35 and 40 may be similarly controlled such that the change in either current to or voltage across the active sensor 35 is related to $\Delta R$ and $\Delta T$, which may be used to determine heat transfer.

Still another possibility for obtaining the necessary measurements is to hold the differential temperature $\Delta T$ of the active and reference RTDs constant. According to this scheme the power is varied as a function of the flow rate or heat transfer. That is, as the flow rate increases (or heat transfer increases), additional power must be applied to the heated RTD sensor in order to hold the temperature constant.

In this technique, the signal conditioner maintains a constant $\Delta T$. Since the resistance and temperature relationship for an RTD is fixed, $\Delta R$ is also constant. To maintain $\Delta T$ or $\Delta R$ constant, both $\Delta V$ and $\Delta I$, or $\Delta$ power, can be monitored to provide a basis for calculating flow rate, or in the case of the gas properties sensor, for calculating heat transfer. These calculations may be obtained using any particular process temperature as a function of the power needed to hold a constant temperature difference.

As yet another alternative, voltage can be maintained constant, which is the converse of the constant current scheme described above. When $\Delta V$ is maintained constant, the current changes with temperature changes. The $\Delta I$ provides the basis for determining flow rate (sensor 15) or heat transfer (sensor 20).

The above described methods for determining flow rate of flowing gas, and for measuring heat transfer of a no-flow sample of the flowing gas, are well known to those of ordinary skill in the field of heated sensor technology. Whether sensors 25, 30, 35, and 40 are operated as constant current, constant power, constant differential temperature, or constant voltage, it is possible to reverse the sensor roles to supply the heating stimulation to what had been the reference sensor and to supply the lower, non-heating stimulation to what had been the active sensor. The same measuring technique is typically used for both the flow sensor and the gas properties sensor, but this is not a requirement and different measuring techniques may be used, if desired.

Figure 13:
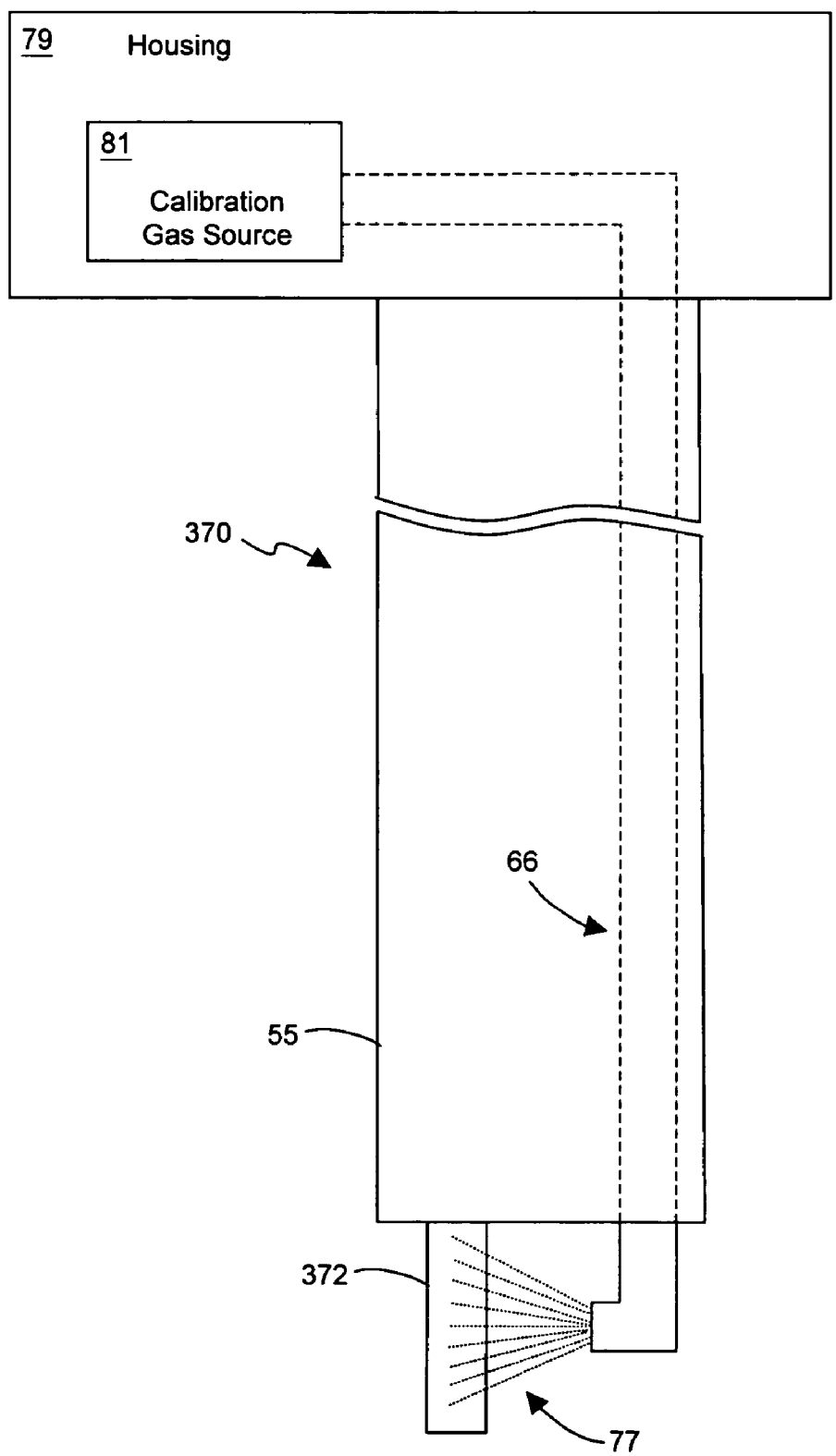
FIG. 13 is a side view of a flowmeter probe configured with a single element flow sensor.

As described above, the flow and gas properties sensors are each typically configured with two distinct sensors; an active sensor and a reference sensor. However, other configurations are possible. For example, a single element sensor may operate in a time-shared fashion, where it serves as the heated sensor for a predetermined short period of time. Then, the sensor is allowed to cool (20-40 seconds being typical) to serve as the substantially unheated, reference sensor. A reference measurement may then be obtained and the heating-cooling cycle may be repeated on a continuous or periodic basis as may be required or desired. An example of a single element sensor is depicted in FIG. 13.

Referring still to FIG. 5, signal processor 130 may be implemented using a computing device such as a microprocessor, hard wired state machine, digital signal processor, microcontroller, application specific integrated circuit (ASIC), embedded processor, or any other suitable control or processing device. The signal processor is typically configured with appropriate memory 135 for processing, recording, and storing data relating to the operation of the flowmeter. The memory unit may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage means.

One function of the signal processor is to calculate an initial, uncorrected, flow rate of the gas media from the output of flow sensor 15, and the heat transfer of a no-flow sample of the gas from the output of gas properties sensor 20. The signal processor further provides a corrected flow rate of the gas media based upon the uncorrected flow rate, as compensated for any change in the heat transfer of the gas. The signal processor may also be used to perform the various calibration techniques presented herein.

Again, the initial, uncorrected, flow rate and heat transfer can be determined based upon $\Delta R$, $\Delta T$, $\Delta I$, $\Delta V$, or any other suitable measuring technique. Instructions for operation of the flowmeter can be applied to the signal processor by a suitable entry device such as keypad 140. Local output from the flowmeter may be shown on display 145, which may be a CRT, LCD, LED screen, or a printer, or other display device. If desired, additional outputs may be provided by parallel or serial interface 150, which can drive external operations such as controls for the meter or for modifying the monitored process. Output driver 155 may be employed to drive external indicators such as additional displays, a printer, or optical or audible alarms, for example.

In accordance with a one mode of operation, the measuring of the flow rate of gas media flowing in conduit 65 may proceed as follows. First, the flowmeter of FIGS. 1, 2, and 5 energize active RTD sensor 25 with constant current to heat it to a predetermined temperature, and a much smaller constant current will be applied to energize or enable reference RTD sensor 30, but without increasing its temperature to any appreciable extent. Contemporaneously, the active and reference RTD sensors 35 and 40 of gas properties sensor 20 are similarly energized.

As the gas mixture flows past the active and reference sensors 25 and 30 of flow sensor 15, heat will be dissipated from active sensor 25 and the temperature differential will decrease. A change in differential temperature ($\Delta T$) is reflected as a change in differential resistance ($\Delta R$). The $\Delta R$ at any time is interpreted by signal processor 130 as a particular flow rate of the gas media flowing in conduit 65, and the flowmeter provides the appropriate outputs. When $\Delta R$ decreases, the flowmeter shows an increase in flow rate because heat is more readily dissipated by the gas media from the heated active sensor than the relatively unheated reference sensor. An example of flow rates relative to $\Delta R$ values is depicted by curves 215, 220, and 225 in FIG. 6.

Measuring the flow rate of calibration gas 77 during a calibration process may be accomplished in a manner similar to that used to measure gas media flowing in conduit 65. For example, the $\Delta R$ at any time may be interpreted by signal processor 130 as a particular flow rate of the calibration gas 77.

The calculated flow rate is typically quite accurate. However, when the composition of the gas mixture changes, the calculated flow rate may include appreciable levels of error. One reason for such error is the change in thermal conductivity or heat transfer of the gas mixture flowing past flow sensor 15. A flare gas stream is one example where variable mixtures of gas compositions are experienced. For example, a typical flare gas stream may contain mixtures of volatile hydrocarbon gases including methane, butane, ethane, and pentane, among others. Gases such as oxygen, nitrogen, carbon dioxide, hydrogen sulfide, hydrogen, and propylene may also be present.

In accordance with an embodiment of the invention, outputs from gas properties sensor 20 may be used to compensate for any inaccuracies of the initially measured flow rate. For example, as detectable amounts of the flowing gas mixture enters the no-flow chamber of mid-well 75, active and reference sensors 35 and 40 of gas properties sensor 20 are exposed to the gas mixture. Similar to the flow sensor, heat will be dissipated from active sensor 35 and the temperature differential will decrease in relation to the heat transfer of the gas mixture. Again, a change in differential temperature ($\Delta T$) is reflected as a change in differential resistance ($\Delta R$).

Since the gas properties sensor is located within a no-flow environment, the $\Delta R$ data relates to heat transfer of the gas mixture, not to flow rate. In situations where the heat transfer of the gas mixture increases, a corresponding decrease in $\Delta R$ is experienced. Conversely, as the heat transfer of the gas mixture decreases, a corresponding increase in $\Delta R$ is detected.

Note that during a typical calibration process, the calibration gas provided by calibration gas source 81 remains the same or effectively the same throughout the calibration process. As such, gas properties sensor 20 does not need to function during a typical calibration process since there is no change in the calibration gas mixture. If desired, a flowmeter may additionally be configured to include pressure transducer 315, as will be described in more detail in later figures.

Figure 6:
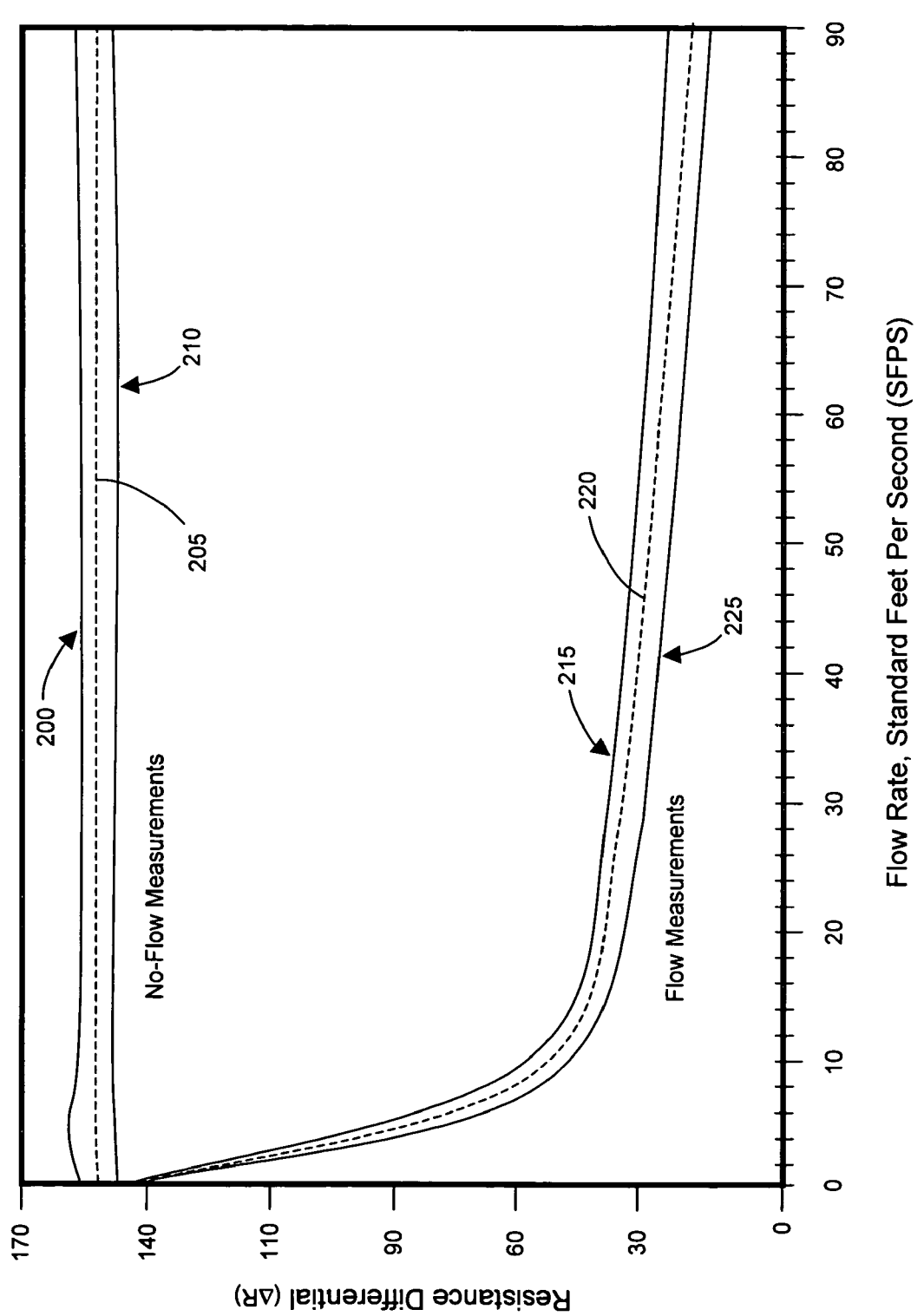
FIG. 6 is a graph showing a particular example of the correlation between $\Delta R$ and the respective outputs of the flow and gas properties sensors.

FIG. 6 is a graph showing a particular example of the correlation between $\Delta R$ and the respective outputs of flow sensor 15 and gas properties sensor 20. Near the top portion of this graph are three line plots associated with outputs generated by the gas properties sensor. Line 200 represents readings obtained from a gas mixture of 100% propane, serving in this example as a baseline gas. Lines 205 and 210 represent readings obtained from gas mixtures of, respectively, 95% propane and 5% hydrogen, and 85% propane and 15% hydrogen. As shown in this graph, the $\Delta R$ of each particular gas mixture remains substantially unaffected by the flow rate. This is because of the no-flow environment in which the gas properties sensor obtains these measurements.

The values of $\Delta R$ for lines 205 and 210 are less than that of line 200 since the $\Delta R$ would naturally decrease as the baseline mixture of 100% propane is replaced with increasing amounts of hydrogen, which exhibits a relatively higher level of thermal conductivity or heat transfer. One way of stating this relationship is to associate the particular gas combinations with a $\Delta R$ value, relative to a baseline gas mixture such as propane.

Flow curve 215 represents readings obtained from flow sensor 15 of a flowing gas mixture of 100% propane, while flow curves 220 and 225 are readings obtained from gas mixtures of, respectively, 95% propane and 5% hydrogen, and 85% propane and 15% hydrogen. The curves and lines in this graph may be associated as follows: line 200 and curve 215; line 205 and curve 220; and line 210 and curve 225. As previously described, a decrease in $\Delta R$ values may be correlated to an increase in flow rate.

The various flow curves readily show that as the composition of the gas mixture changes, so does the $\Delta R$ values and consequently the flow readings of these gases. Conventional sensors are not readily able to compensate for the gas composition changes, and thus are susceptible to errors in flow rate calculations. One technique for overcoming flow measuring errors of variable mixed-gas compositions is to utilize a representative gas mixture for calibrating the flow sensor. However, as can seen in FIG. 7, this is not always a workable solution because of the possibility of error in a calculated flow rate when the measured gas mixture deviates from a baseline mixture.

Figure 7:
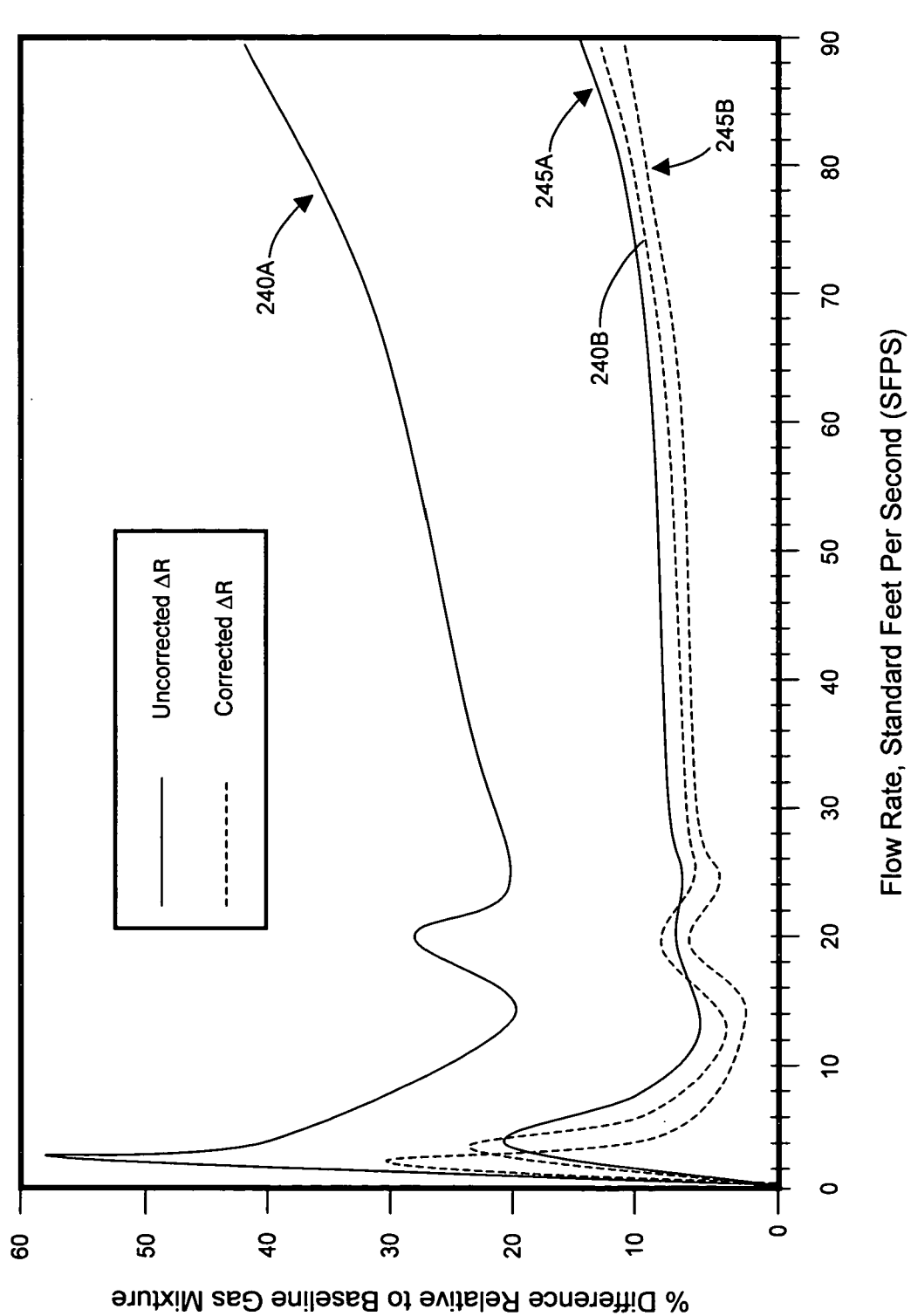
FIG. 7 is a graph showing exemplary flow rates of gas mixtures of varying composition, relative to a baseline gas mixture.

FIG. 7 is a graph showing flow rates of gas mixtures of varying composition, relative to a baseline gas mixture. In this graph, the X-axis represents the baseline gas mixture of 100% propane at a given flow rate, while the Y-axis represents the relative difference between the baseline gas and two separate gas mixtures.

Flow curve 240A reflects the amount of error obtained from a gas mixture of 95% propane and 5% hydrogen, while flow curve 245A is the amount of error obtained from a gas mixture of 85% propane and 15% hydrogen. This graph shows that substantial error in calculated flow rate may occur whenever the gas composition changes from a baseline composition of 100% propane.

In accordance with one embodiment, gas properties sensor 20 is adapted to detect changes in heat transfer relative to a baseline gas. Once again, changes in the heat transfer of flowing gas affect the accuracy of the measured flow rate. Consequently, if a change in heat transfer is detected, the measured flow rate is adjusted to compensate for this change.

Examples of corrected flow are also shown in the graph of FIG. 7. Specifically, flow curve 240B represents a correction of the flow calculation of a gas mixture of 95% propane and 5% hydrogen, while curve 245B represents a correction of the flow calculation of a gas mixture of 85% propane and 15% hydrogen. FIG. 7 shows one example of how compensating for a change in heat transfer of a gas mixture provides a considerable increase in accuracy of the calculated flow rate.

The use of 100% propane as a baseline gas has been used herein as one particular example of a possible gas that may be used to calibrate the flowmeter, but any other suitable gas or gas mixture composition may be used. The baseline gas mixture is typically selected as being representative of the gas composition that will be experienced in a particular application, but no single gas composition is required.

Figure 8A:
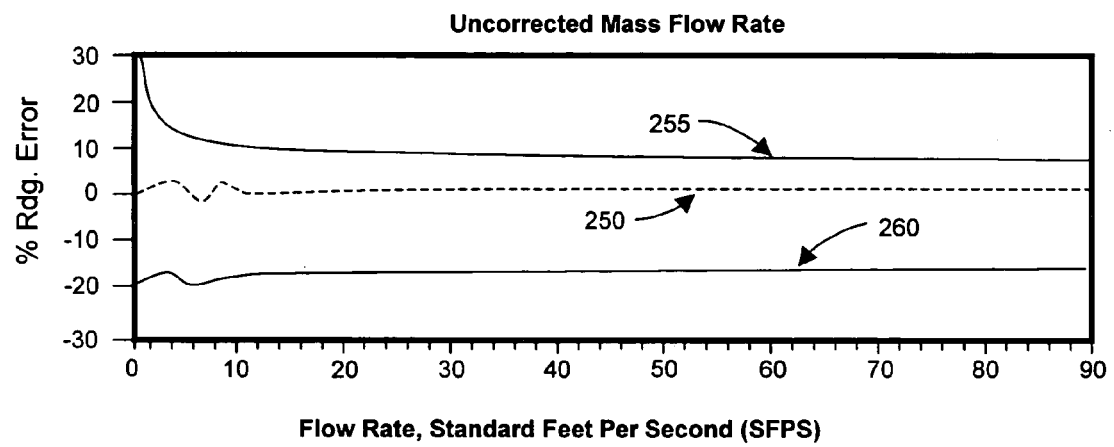
FIGS. 8A and 8B are graphs showing possible flow error rates of gas mixtures of different composition, relative to a baseline gas mixture.
Figure 8B:
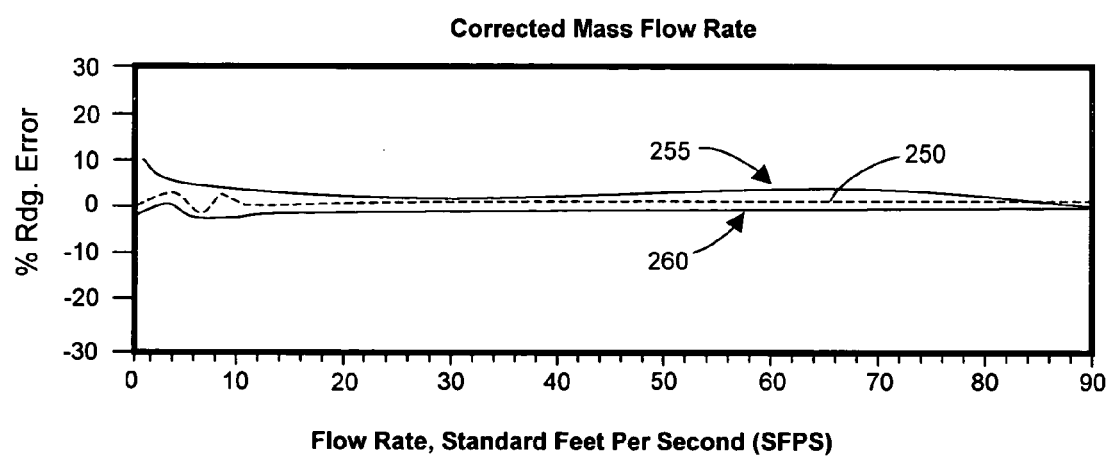

The graphs of FIGS. 8A and 8B show possible flow error rates of gas mixtures of different composition, relative to a baseline gas mixture. For example, FIG. 8A shows raw, uncorrected flow data obtained from various gas mixtures using flow sensor 15, while FIG. 8B shows corrected flow data after compensating for changes in heat transfer of the gas mixtures, as detected by gas properties sensor 20.

In these graphs, curve 250 represents flow readings obtained from a baseline gas mixture of 70% $N_2$, 10% $C_4H_{10}$, 6% $CH_4$, and 14% $CO_2$. Curve 255 depicts readings obtained from a gas mixture of 50% $CH_4$ and 50% $N_2$, while curve 260 represents readings obtained from a gas mixture of 50% $CO_2$ and 50% $N_2$. FIG. 8A shows that the initial flow rates generated by the output of flow sensor 15 experience considerable error whenever the measured gas mixtures deviates from the baseline composition. FIG. 8B provides an example of the amount of correction of the initial flow values that may be achieved by compensating for the changes in heat transfer of gas mixtures, relative to a baseline mixture. In this particular example, the original flow error rates were about 10–20% (FIG. 8A), which were then corrected to an error rate on the order of a very few percent, on average (FIG. 8B).

Figure 9:
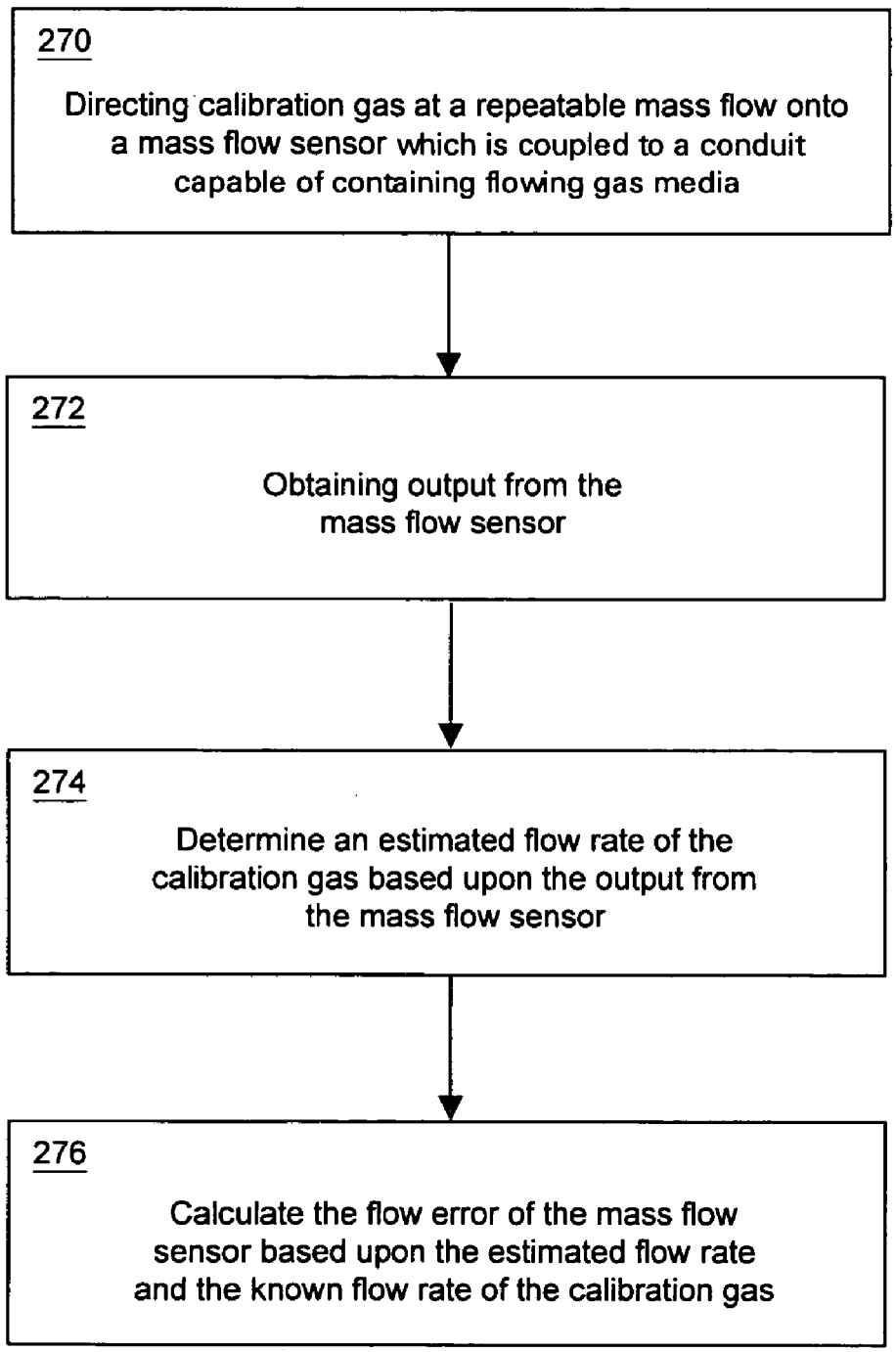
FIG. 9 is a flowchart showing operations for calibrating a flowmeter.

FIG. 9 is a flowchart showing operations for calibrating a flowmeter according to an embodiment of the invention. At block 270, calibration gas is introduced into a calibration gas tube positioned relative to a mass flow sensor. In block 272, the calibration gas is directed at a repeatable mass flow onto the mass flow sensor. In block 274, output is obtained from the mass flow sensor. Next, an estimated flow rate of the calibration gas is determined based upon the output from the mass flow sensor (block 276). If desired, the error of the estimated flow rate may be calculated based upon the actual flow rate of the calibration gas and the estimated flow rate the calibration gas (block 278).

Information obtained from the various calibration techniques disclosed herein may be used in a variety of different ways. For instance, the error of the estimated flow rate may be utilized as part of an offset or compensating value so that future measurements of the calibrated sensor will compensate for the detected error. This offset may be stored locally in memory, or the user can manually calibrate the flowmeter with this information. It is to be understood that the specifics as to various techniques in which a flowmeter may implement the information derived from the various calibration processes presented herein are within the skill of one of ordinary skill and need not be further described.

The method depicted in FIG. 9 may be implemented using, for example, any of the various flowmeter configurations described herein. By way of illustration, additional embodiments of the present invention having alternative calibration check or verification capabilities, pressure sensing devices, and different flow sensor configurations will now be described.

Figure 10:
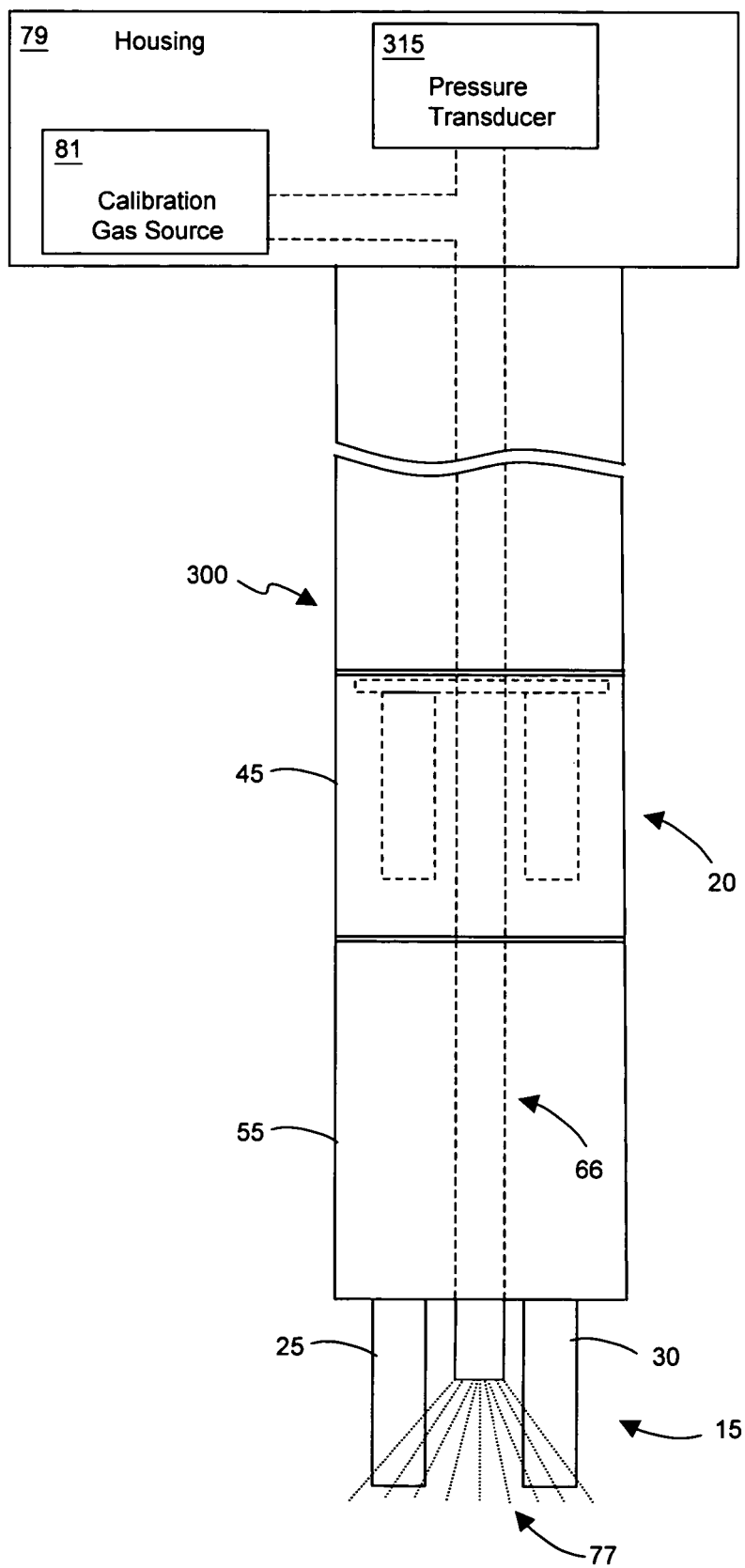
FIG. 10 is a side view of a flowmeter probe configured with calibration and pressure sensing capabilities.

FIG. 10 is a side view of probe 300 which is similar in many respects to probe 10 (FIGS. 1 and 2). The primary difference is that probe 300 is configured with pressure transducer 315, which is in communication with tube 66.

Pressure transducer 315 may be implemented whenever pressure readings of the flowing gas media are desired. Pressure readings ranging from about 1–500 psig are typical. As shown, the pressure transducer is coupled with tube 66 which terminates at the distal end of the probe, near flow sensor 15. In operation, as the gas mixture flows through the conduit, the pressure of the gas mixture will also exist in the tube where it is measured by the pressure transducer. A signal output, representing the pressure of the flowing gas in the conduit, may be communicated to signal processor 130 (FIG. 5). Of course, the calibration and pressure sensor functions operate independently, and can be separated by appropriate valving at the distal end of tube 66. A suitable valve mechanism will also be used to prevent the flowing gas mixture from entering calibration gas source 310.

Since gas properties sensor 20 is located in a no-flow chamber, it is sensitive to pressure. Consequently, the accuracy of the gas properties sensor may diminish as the pressure deviates from a calibration pressure. To compensate for such pressure related inaccuracies, the signals generated by the gas properties sensor may be corrected based upon the pressure readings generated by the pressure transducer.

Figure 11:
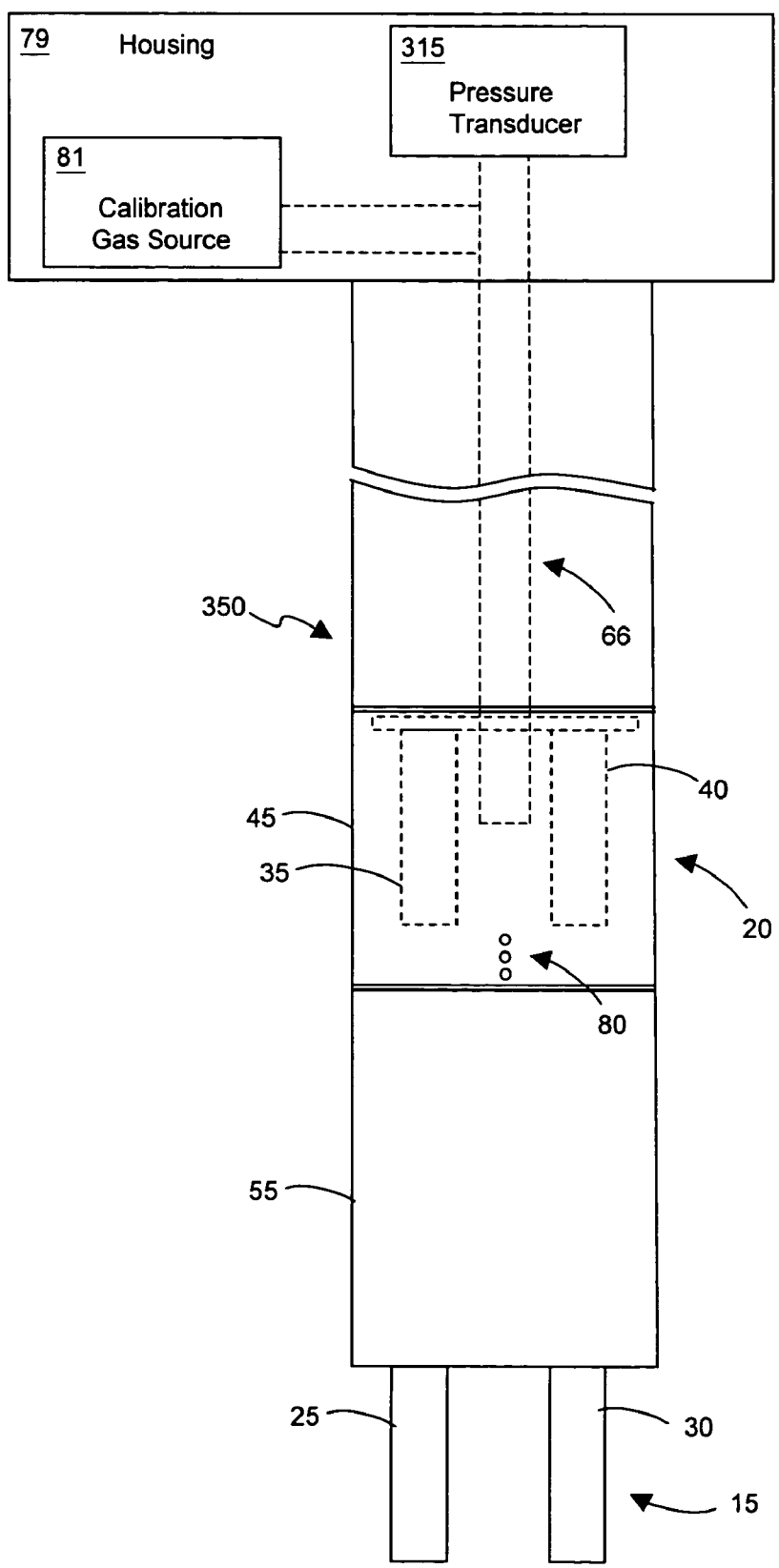
FIG. 11 is a side view of a flowmeter probe configured with calibration and pressure sensing capabilities.

FIG. 11 is a side view of probe 350. In this embodiment, tube 66 terminates within the no-flow chamber of mid-well 45, adjacent to the active and reference sensors of gas properties sensor 20. Optional pressure transducer 315 obtains pressure readings of the flowing gas media from the gas that enters the no-flow chamber of the mid-well.

The calibration process for probe 350 varies slightly from other embodiments. In this embodiment, calibration gas source 81 supplies calibration gas to the active and reference sensors of gas properties sensor 20. In contrast to mass flow sensor 15, the gas properties sensor provides output relating to the estimated heat transfer of the gas mixture in contact with the sensor. During the calibration process, the calibration gas is directed onto the gas properties sensor. Next, an estimated heat transfer of calibration gas is determined based upon the output of the gas properties sensor. If desired, the error of the estimated heat transfer of the calibration gas may be calculated based upon the difference between the actual or expected heat transfer of the calibration gas and the estimated heat transfer of this gas.

As noted above, calibration of flow sensor 15 may be accomplished using calibration gas directed on the flow sensor a number of different flow rates. In contrast, gas properties sensor 20 may be calibrated using a number of different gas mixtures, each having a different heat transfer attribute.

Although the calibration gas source and the pressure transducer shown in FIGS. 10 and 11 share a common tube, this is not a requirement and each of these devices may be independently configured with separate tubes, if desired. Probes 300 and 350 are shown having both the calibration function and a pressure transducer, but other possibilities exist where either calibration gas source 81 or pressure transducer 315 is omitted.

In accordance with alternative embodiments, certain aspects of probes 300 and 350 may be combined. For instance, a probe may be configured with calibration gas source 81 having one tube that terminates near thermal flow sensor 15 (FIG. 10), and a separate tube that terminates near gas properties sensor 20 (FIG. 11). This embodiment permits calibration of both the thermal flow sensor and the gas properties sensor.

The flow and gas properties sensors have been shown in relative close proximity to the flowmeter controls and electronics in housing 79. However, it is equally possible that any or all elements of the flowmeter may be remotely located with respect to the conduit and the sensors or other signal-producing elements which have an active relationship with the flowing media. Signals generated by the various sensor components can be connected by wires or these components may be wirelessly coupled.

The normal signal and power wires have not been shown but would pass through the probe from housing 79 to the sensor elements. In the embodiments having a tube within the probe, the wires could be housed in the tube.

Figure 12:
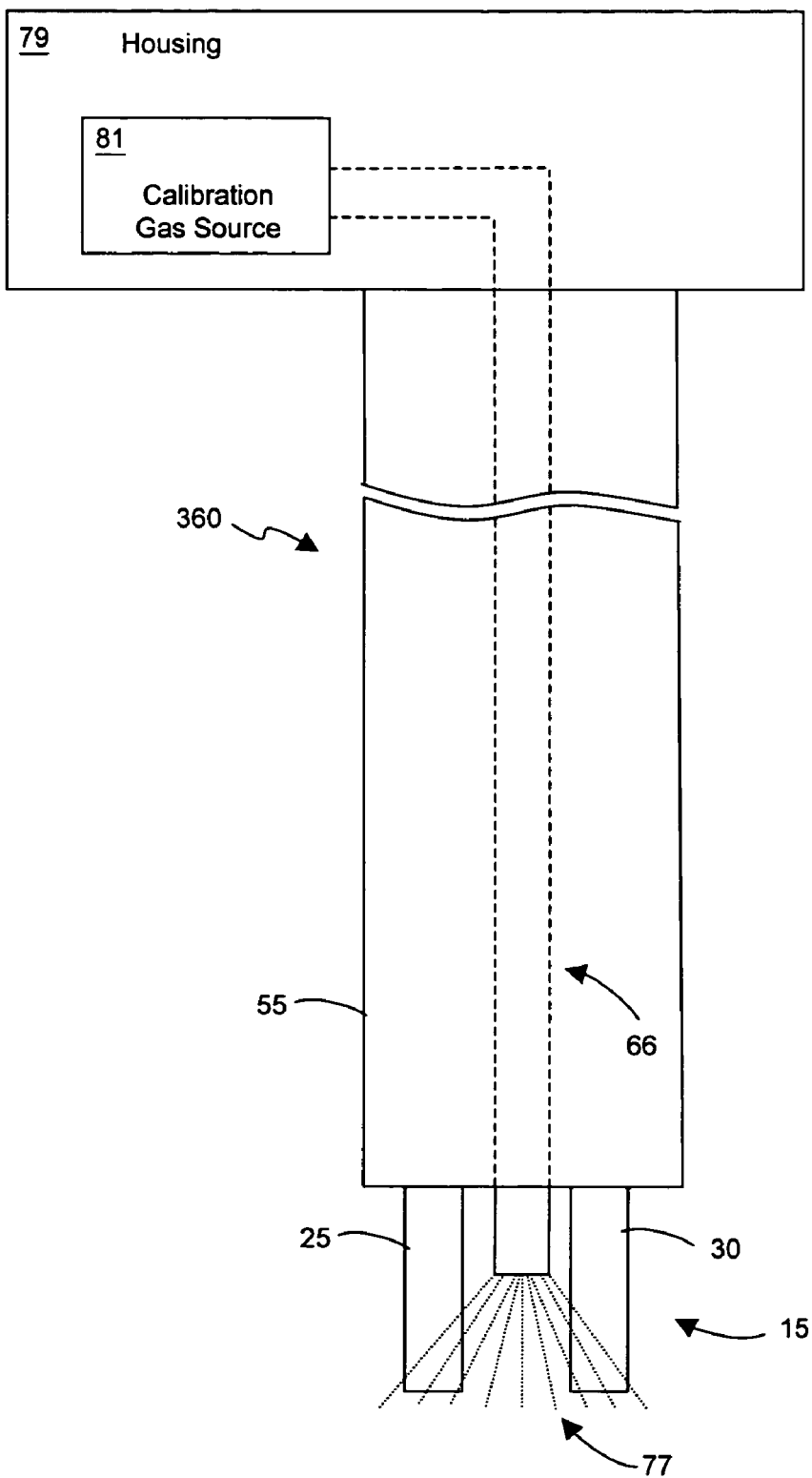
FIG. 12 is a side view of a flowmeter probe configured with calibration capabilities.

In addition to the above embodiments, a number of different types of flowmeters having calibration functionality are possible. For example, FIG. 12 depicts a side view of probe 360, which includes flow sensor 15. Notably, probe 360 does not have a gas properties sensor.

In FIG. 13, probe 370 in configured with a single element flow sensor 372, which effectively provides flow measurements similar to that which may be obtained by flow sensor 15. For example, sensor 372 may operate in a time-shared fashion, where it serves as a heated sensor for a predetermined short period of time. Then, the sensor is allowed to cool (20-40 seconds being typical) to serve as the substantially unheated, reference sensor. A reference measurement may then be obtained and the heating-cooling cycle may be repeated on a continuous or periodic basis as may be required or desired. Calibration measurements may be taken when flow sensor 372 is in the heated portion of the heating-cooling cycle. If desired, calibration measurements may also be taken when flow sensor 372 is in the cooled portion of the heating-cooling cycle.

In the embodiment of FIG. 13, the exposed end of tube 66 is bent at an approximate right angle relative to flow sensor 372. This arrangement permits a more focused concentration of calibration gas 77 to strike the flow sensor, as compared to, for example, the embodiment of FIG. 12. When probe 370 is inserted into conduit 65, the open end of tube 66 is optimally directed downstream of the gas media flowing in the conduit. This arrangement helps prevent particles and other types of foreign objects from lodging in the tube.

Figure 14:
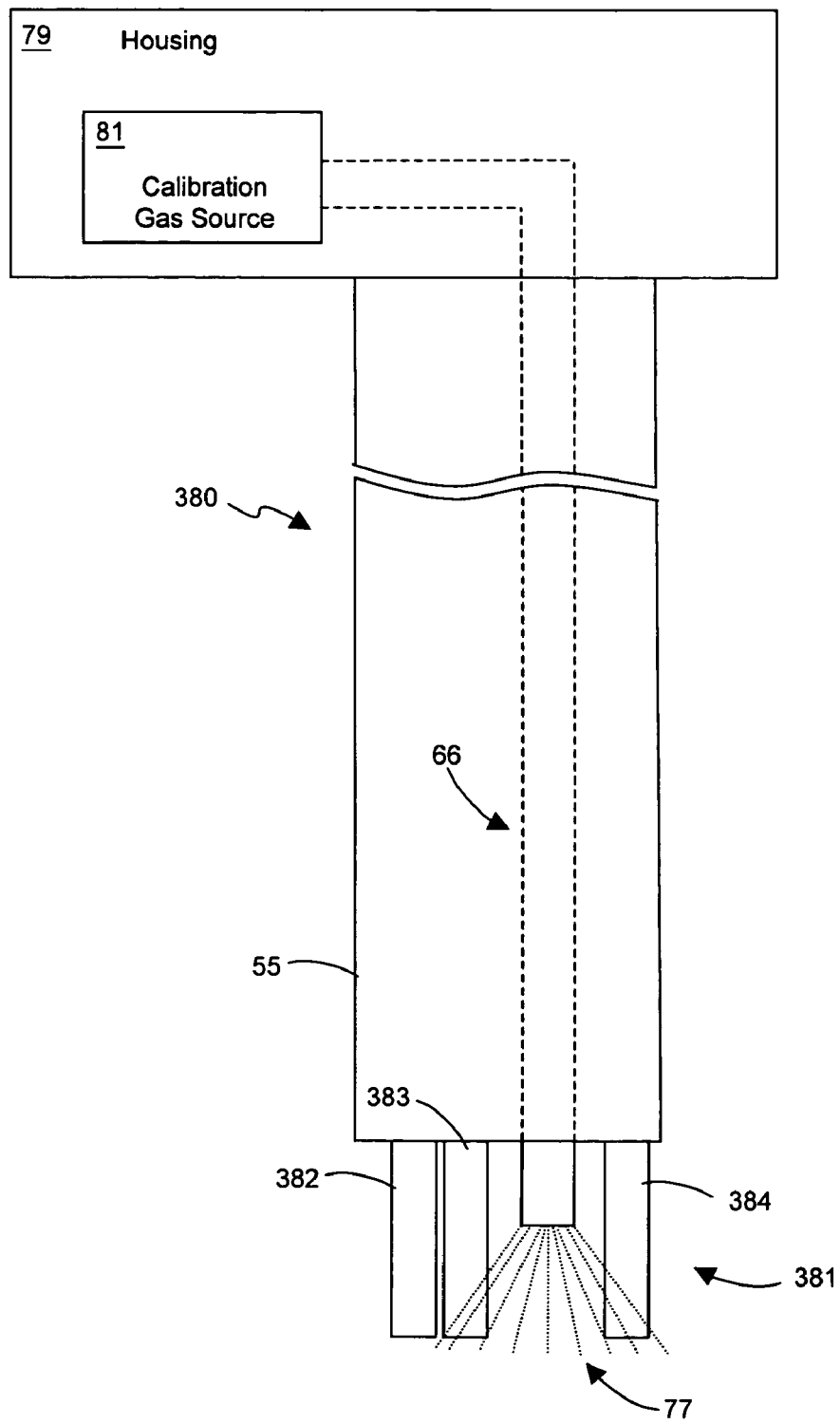
FIG. 14 is a side view of a flowmeter probe configured with three probes defining a flow sensor.

In FIG. 14, probe 380 is configured with three probes which define flow sensor 381. In this embodiment, heater element 382 is external of active sensor 383 and reference sensor 384. During operation, the heater element is thermally bonded to the active sensor by convective or conductive means. The reference sensor is not heated by the heater element. Flow sensor 381 effectively provides flow measurements similar to that which may be obtained by flow sensor 15.

Figure 15:
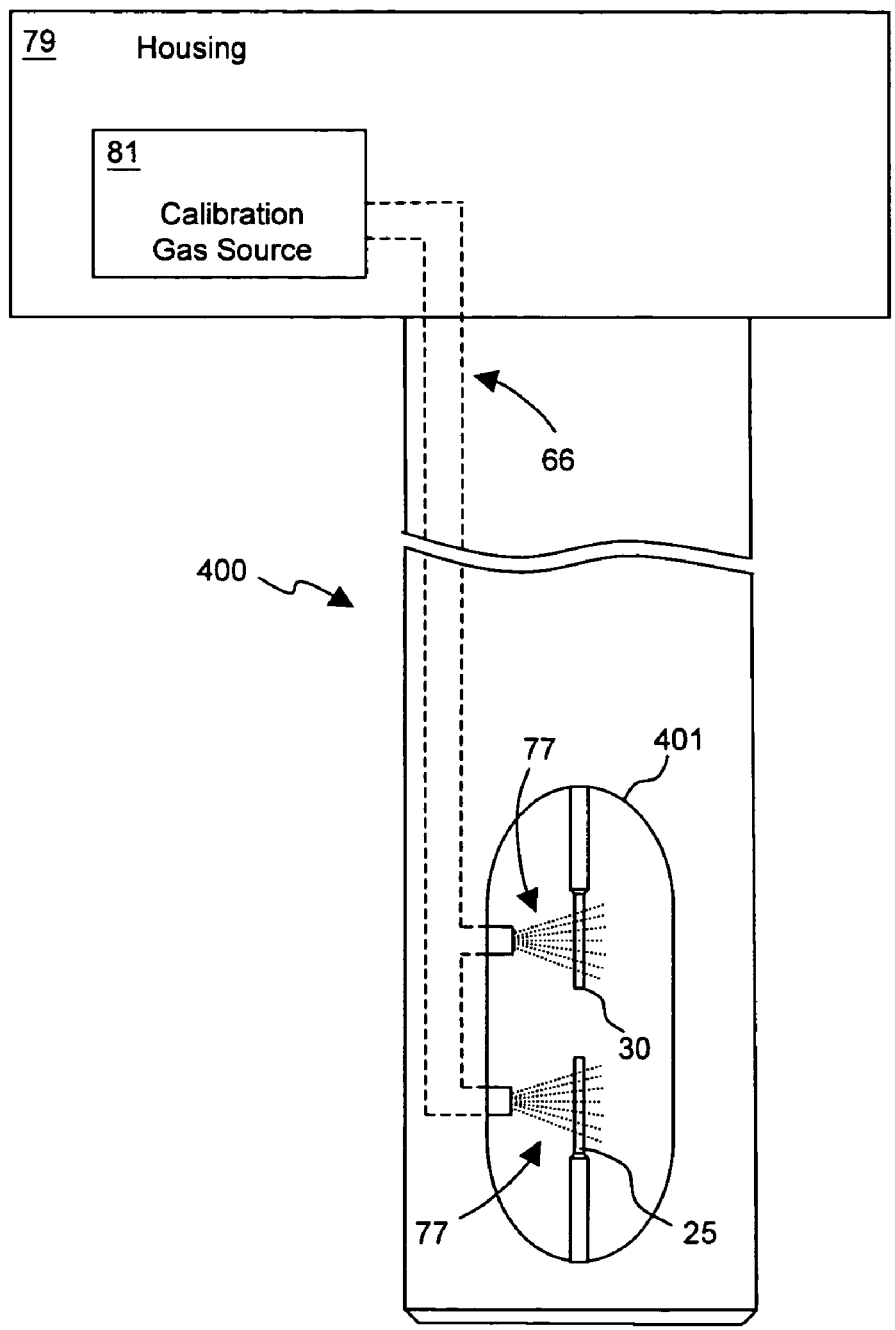
FIG. 15 is a side view of a flowmeter probe configured with active and reference sensors positioned within a probe opening.

FIG. 15 is a side view of probe 400, which includes active sensor 30 and reference sensor 25 positioned within opening 401. The active and references sensors measure the rate of flow of media flowing through the opening. In this embodiment, tube 66 has two apertures which each emit calibration gas 77. A first aperture directs the calibration gas onto reference sensor 30, and a second aperture directs the calibration gas onto active sensor 25. As previously described, a calibration process may alternatively be accomplished without applying calibration gas to the reference sensor. In such an embodiment, it is not necessary for tube 66 to include the first aperture which provides calibration gas to reference sensor 30.

The particular arrangement of the flow sensor components depicted in FIGS. 12–15 is not critical or essential, and known flow sensor techniques may be used. Examples of such techniques are provided in U.S. Pat. Nos. 5,600,528 and 5,780,737, both of which are assigned to Fluid Components International of San Marcos, Calif. If desired, any of the probe embodiments of FIGS. 12–15 may also include and function using gas properties sensor 20.

In general, the flowmeters disclosed herein may implement calibration tubes having any of a variety of different shapes and configurations. In many situations, the particular type of calibration tube implemented is not critical, as long as the tube can deliver repeatable mass flow of calibration gas 77 to the appropriate flow sensor or sensors. FIGS. 16–21 show various calibration tube configurations which may be used in conjunction with any of the flow sensors and gas properties sensors disclosed herein.

Figure 16:
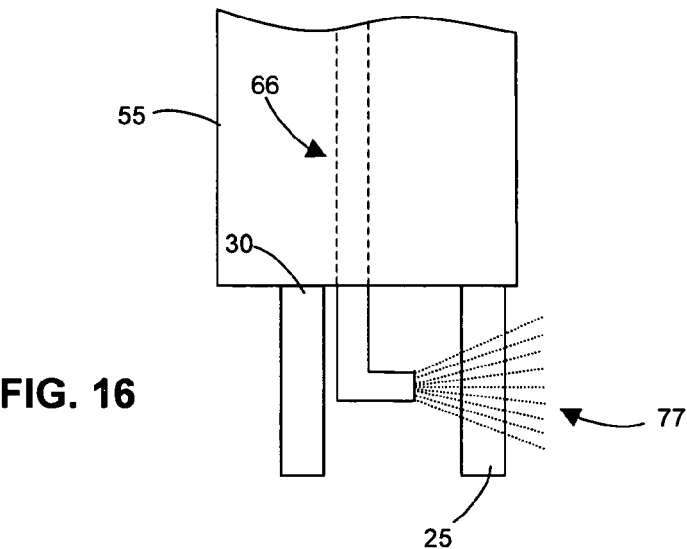
FIGS. 16–18 show various calibration tube designs.
Figure 17:
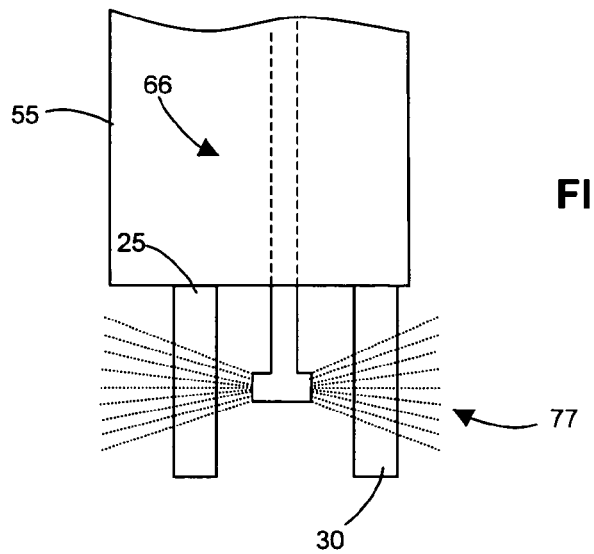

Similar to FIG. 13, FIG. 16 shows the exposed end of tube 66 bent at an approximate right angle relative to active sensor 25. This arrangement permits a more focused concentration of calibration gas 77 to be directed onto the active sensor. This arrangement would typically be used in situations in which there is a only small difference between the temperature of the calibration gas and the temperature of the active sensor. In FIG. 17, the exposed end of tube 66 is T-shaped and directs calibration gas 77 onto both active and reference sensors 25 and 30.

Figure 18:
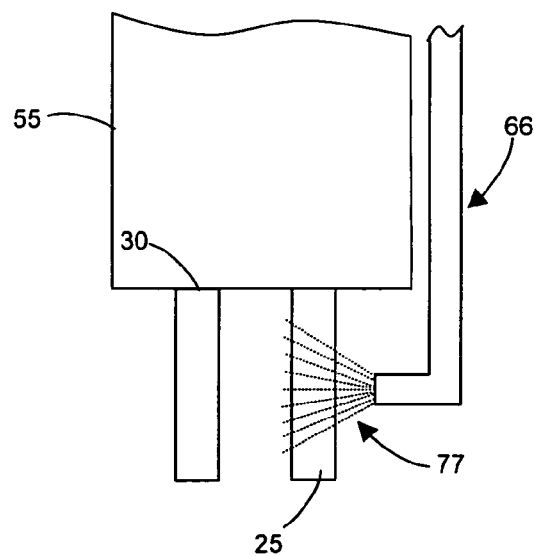

Several embodiments show tube 66 passing within the associated probe, but this is not a requirement and the calibration tube may be externally mounted such that it is attached to the outside of the probe or to any other suitable structure. An example of this embodiment is shown in FIG. 18. As shown in this figure, the terminating portion of the tube is bent at an approximate right angle relative to active sensor 25. If desired, the tube may be alternatively positioned so that calibration gas 77 strikes both the active and reference sensors 25 and 30.

Figure 19:
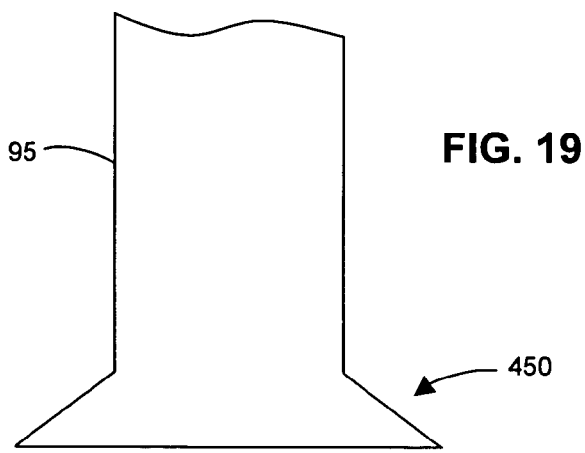
FIGS. 19–21 show various designs for the end portion of a calibration tube.
Figure 20:
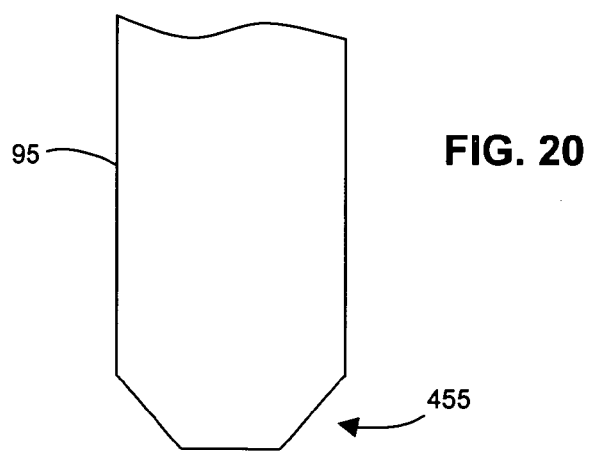
Figure 21:
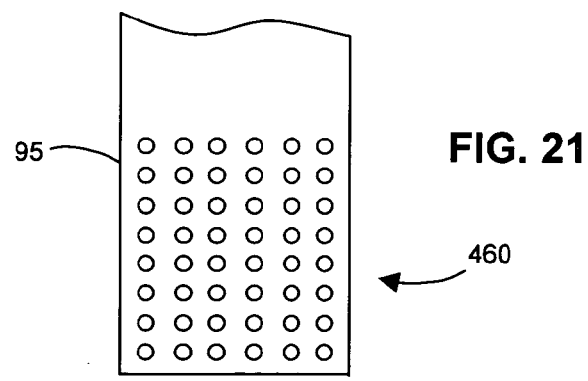

FIGS. 19–21 show various alternative designs for the end portion of calibration tube 66. The alternative tube configurations may be used for implementing any of the calibration embodiments disclosed herein.

In FIG. 19, the tube has an outwardly projecting end 450. This arrangement directs the calibration gas over a relatively wide area. Conversely, FIG. 20 shows calibration tube 66 having end 455 which is more narrow that the main body of the tube. This design provides a more focused stream of calibration gas. FIG. 21 shows the calibration tube with a number of perforations or apertures 460 formed at the end of the tube. These apertures may be formed over only a portion of the exposed part of the tube so that only the active sensor is exposed to the calibration gas. Alternatively, these apertures may be formed about the entire perimeter of the tube, permitting calibration gas to impinge upon both the active and reference sensors.

Figure 22:
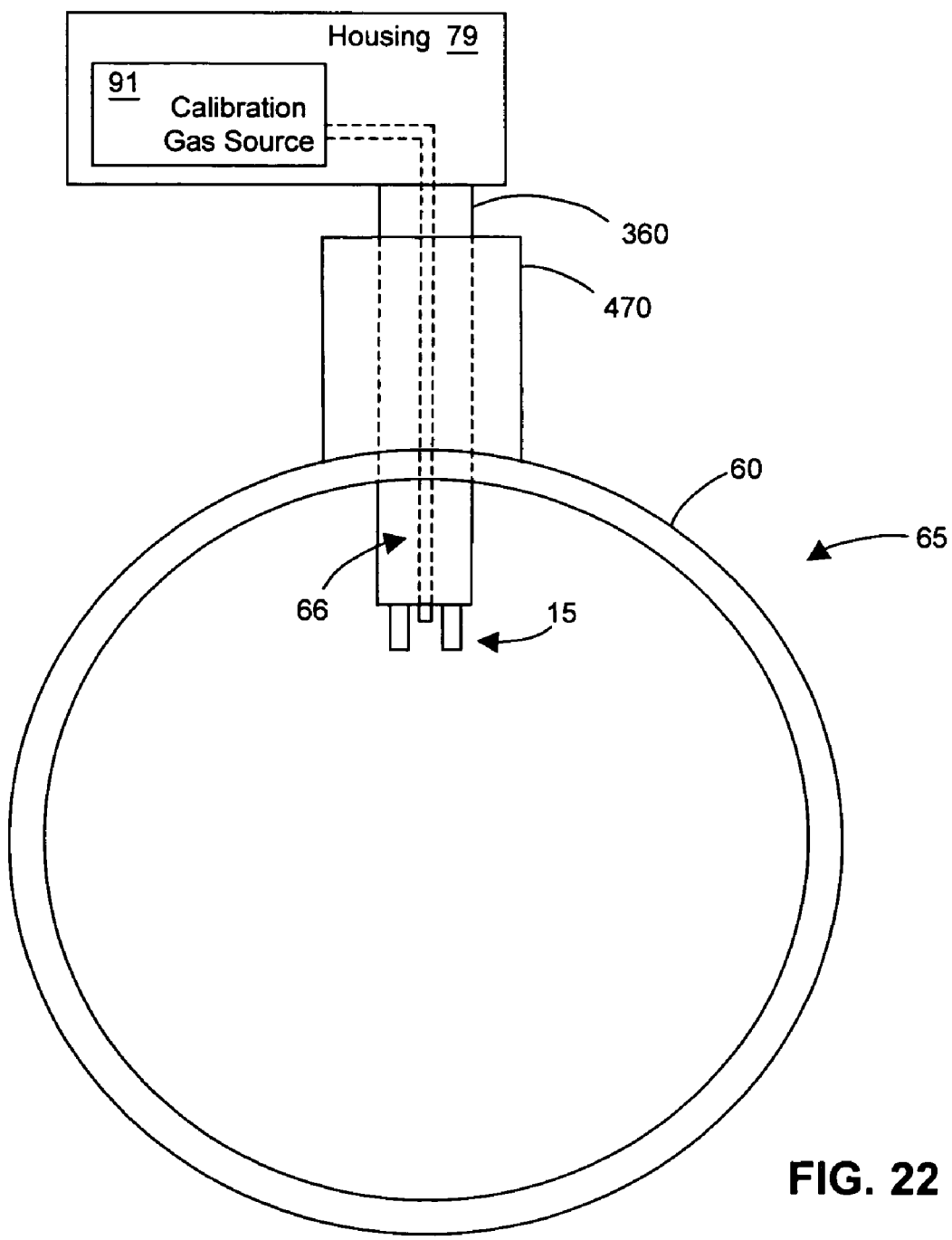
FIG. 22 shows an exemplary implementation of the flowmeter probe of FIG. 12 positioned within a conduit.

A previously noted, a flowmeter may be calibrated in-situ by retracting the probe and associated sensors from a conduit containing flowing gas media. In accordance with an embodiment, FIG. 22 shows probe 360 operatively coupled to housing 470. Positioning the probe within the interior portion of conduit 65 permits flow sensor 15 to measure the rate of flow of gas media flowing within the conduit. FIG. 22 illustrates the normal operating position of the flowmeter.

Figure 23:
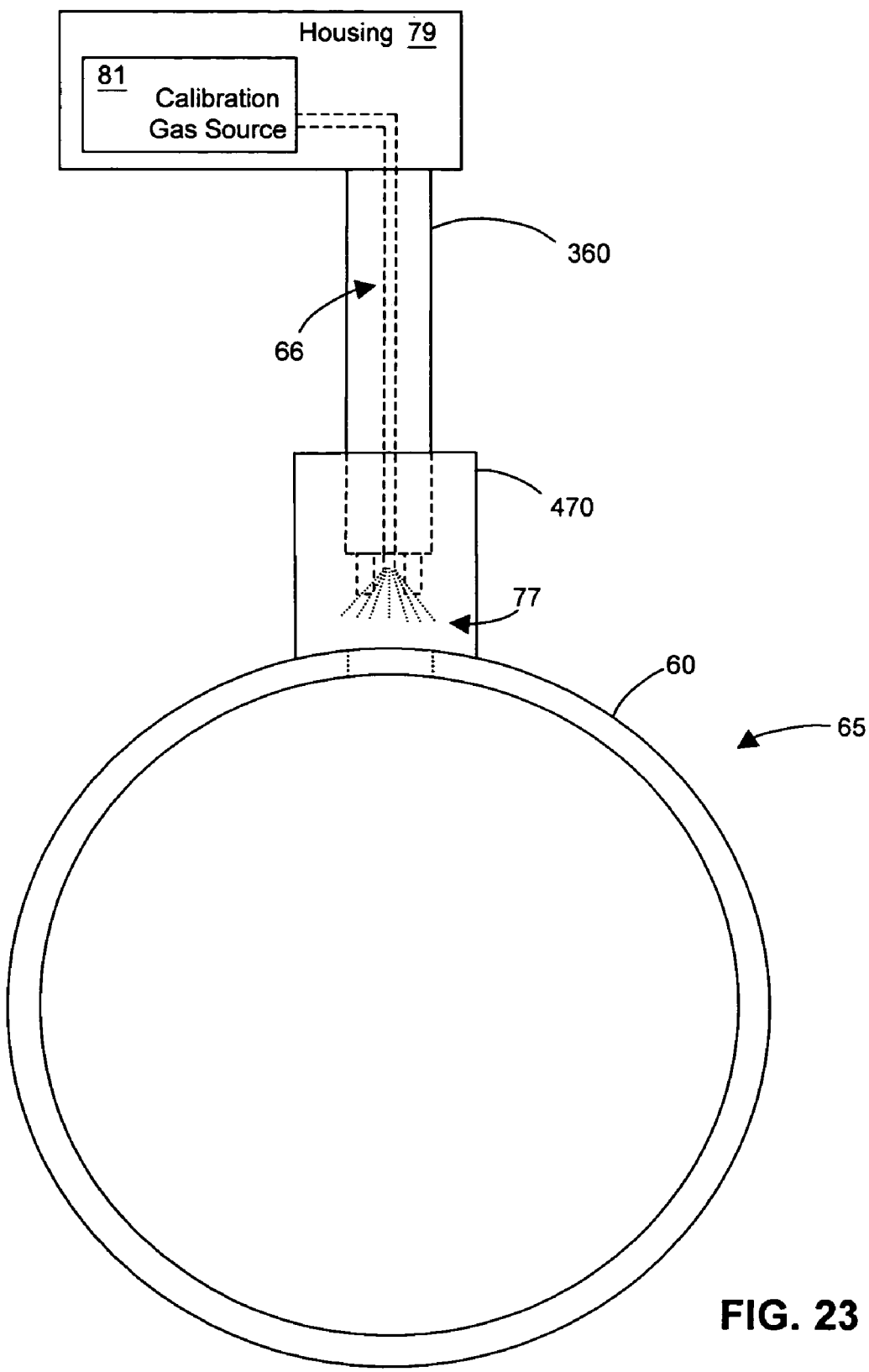
FIG. 23 shows the flowmeter probe of FIG. 22 retracted from the conduit and undergoing a calibration process.

At some point, it may be necessary or desirable to calibrate the probe. Referring now to FIG. 23, a calibration process can be initiated by withdrawing probe 360 from within the interior of conduit 65. After flow sensor 15 is received within a cavity defined within housing 470, the flow sensor may be calibrated by directing calibration gas 77 onto the flow sensor. Calibration of the flow sensor may proceed using any of the previously described calibration techniques.

Typically, some amount of the gas media flowing within the conduit will migrate into the cavity of housing 470 and contact the flow sensor. However, such contact is relatively minor and does not substantially affect the accuracy of the calibration process. To minimize the affect of the flowing gas media, housing 470 may be optionally equipped with a device, such as a valve or sliding plate (not shown), which effectively isolates the flow sensor from gas media flowing within the conduit.

After the calibration processes is completed, the probe may be reintroduced to the interior of conduit 65, as shown in FIG. 22. The calibration technique illustrated in FIGS. 22 and 23 may be used to calibrate any of the flowmeters described herein. The calibration process shown in FIGS. 22 and 23 may be performed manually by a user, or the process can be initiated and performed automatically.

Various embodiments have been described in which a flowmeter adapted to measure flowing gas media is configured with a calibration verification feature. However, the teachings of the present disclosure apply equally to other types of flow sensors. Examples of such sensors include a hot wire anemometer, a Doppler sensor, and a vortex shedder, among others.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

What is claimed is:

1. A calibration system, comprising:
   a conduit comprising a first end positioned relative to a flow sensor;
   a gas source for introducing calibration gas into said conduit at a repeatable mass flow, said conduit directing at least a portion of said calibration gas onto said flow sensor; and
   a computational device for determining an estimated flow rate of said calibration gas based upon measurements obtained from said flow sensor.

2. The calibration system according to claim 1, said system further comprising:
   a housing which is attachable to a structure capable of containing flowing gas media, and
   wherein said housing is sized to slideably receive a probe having said flow sensor attached thereto, said conduit permitting said flow sensor to extend into said flowing gas media during a flow rate measuring process, and permitting said flow sensor to be retracted into said housing during a calibration process.

3. The calibration system according to claim 1, wherein said flow sensor comprises an integrated active/reference sensor element operating in time-shared fashion such that said integrated active/reference sensor element is a heated, active sensor for a predetermined period of time, and after being permitted to cool, said integrated active/reference sensor serves as a substantially unheated, reference sensor.

4. The calibration system according to claim 1, wherein said flow sensor comprises an active sensor element operating in conjunction with a separate heater element, and a reference sensor element.

5. The calibration system according to claim 1, wherein said flow sensor comprises a thermal dispersion sensor.

6. The calibration system according to claim 1, wherein said flow sensor comprises a hot wire anemometer.

7. The calibration system according to claim 1, wherein said flow sensor is a sensor selected from the group consisting of thermal dispersion sensor, a hot wire anemometer, a Doppler sensor, and a vortex shedder.

8. The calibration system according to claim 1, wherein said first end of said conduit is conic shaped.

9. The calibration system according to claim 1, wherein said first end of said conduit comprises a plurality of apertures defined within at least a portion of said conduit.

10. The calibration system according to claim 1, wherein at least a portion of said conduit is contained within a probe, said probe having said flow sensor attached thereto.

11. The calibration system according to claim 1, wherein said conduit is externally positioned outside of a probe having said flow sensor attached thereto.

12. The calibration system to claim 1, wherein said flow sensor comprises an active sensor element and a reference sensor element.

13. The calibration system according to claim 12 wherein said first end of said conduit is positioned so that said calibration gas is directed only said active sensor element.

14. The calibration system to claim 12 wherein said first end of said conduit is positioned so that calibration gas is directed onto both said active sensor element and said reference sensor element.

15. The calibration system according to claim 12 wherein said conduit compresses a second end, wherein said first end of said conduit is positioned so that said calibration gas is directed onto said active sensor element, and
   wherein said second end of said conduit is positioned so that said calibration gas is directed onto said reference sensor element.

16. A calibration method, comprising:
   introducing calibration gas into a calibration gas tube positioned relative to a flow sensor;
   directing said calibration gas at a repeatable mass flow onto said flow sensor;
   obtaining output from said flow sensor; and
   determining an estimated flow rate of said calibration gas based upon said output from said flow sensor.

17. The method according to claim 16, further comprising:
   calculating flow error based upon said estimated flow rate of said calibration gas and a known flow rate of said calibration gas.

18. The method according to claim 16, wherein after said flow error has been calculated, said method further comprises:
   introducing said flow sensor into a conduit containing flowing gas media; and
   determining actual flow rate of said flowing gas media by measuring outputs obtained from said flow sensor and compensating for said flow error.

19. The method according to claim 16, further comprising:
   directing calibration gas at a plurality of different mass flow rates onto said flow sensor;
   obtaining output from said flow sensor for each of said plurality of different mass flow rates; and
   determining a plurality of estimated flow rates of said calibration gas based upon said plurality of outputs from said flow sensor.

20. The method according to claim 16, wherein said method is initiated automatically.

21. A calibration system, comprising:
   a conduit comprising an end positioned relative to a compensating gas properties sensor mounted within a non-flow chamber of a probe;
   a gas source for introducing calibration gas into said conduit, said conduit directing at least a portion of said calibration gas onto said gas properties sensor; and
   a computational device for determining heat transfer of said calibration gas based upon measurements obtained from said gas properties sensor.

22. A calibration system, comprising:
   means for introducing calibration gas into a calibration gas tube positioned relative to a flow sensor;
   means for directing said calibration gas at a repeatable mass flow onto said flow sensor;
   means for obtaining output from said flow sensor; and
   means for determining an estimated flow rate of said calibration gas based upon said output from said flow sensor.

23. A flowmeter for flowing media in a conduit, comprising:
   a probe adapted to project into said media flowing in said conduit;

a flow sensor in contact with said probe and adapted to provide output signals relating to a flow rate of said media;
a tube comprising a first end positioned relative to said flow sensor;
a gas source for introducing calibration gas into said tube at a repeatable mass flow, said tube directing at least a portion of said calibration gas onto said flow sensor; and
a computational device for determining said flow rate of said media while said flowmeter is operating in a flowing gas media mode of operation, and wherein said computational device further determines an estimated flow rate of said calibration gas based upon measurements obtained from said flow sensor while said flowmeter is operating in a calibration mode.

* * * * *

UNITED STATES PATENT AND TRADEMARK OFFICE
CERTIFICATE OF CORRECTION

| | | |
|---|---|---|
| PATENT NO. | : 7,201,033 B2 | Page 1 of 1 |
| APPLICATION NO. | : 11/038349 | |
| DATED | : April 10, 2007 | |
| INVENTOR(S) | : Eric J. Wible | |

It is certified that error appears in the above-identified patent and that said Letters Patent is hereby corrected as shown below:

Change claim 18 as follows:

--The method according to claim 17, wherein after said flow error has been calculated, said method further comprises:
  introducing said flow sensor into a conduit containing flowing gas media; and
  determining actual flow rate of said flowing gas media by measuring outputs obtained from said flow sensor and compensating for said flow error.--

Signed and Sealed this
Twenty-first Day of February, 2012

David J. Kappos
*Director of the United States Patent and Trademark Office*

UNITED STATES PATENT AND TRADEMARK OFFICE
CERTIFICATE OF CORRECTION

PATENT NO.         : 7,201,033 B2                                                Page 1 of 1
APPLICATION NO.    : 11/038349
DATED              : April 10, 2007
INVENTOR(S)        : Eric J. Wible It is certified that error appears in the above-identified patent and that said Letters Patent is hereby corrected as shown below:

Column 16, lines 21-28, Change claim 18 as follows:

--The method according to claim 17, wherein after said flow error has been calculated, said method further comprises:
 introducing said flow sensor into a conduit containing flowing gas media; and
 determining actual flow rate of said flowing gas media by measuring outputs obtained from said flow sensor and compensating for said flow error.--

This certificate supersedes the Certificate of Correction issued February 21, 2012.

Signed and Sealed this
Twentieth Day of March, 2012

David J. Kappos
*Director of the United States Patent and Trademark Office*